(12) United States Patent
Miyasaka et al.

(10) Patent No.: US 8,848,044 B2
(45) Date of Patent: Sep. 30, 2014

(54) IMAGE PROCESSING APPARATUS, METHOD, PROGRAM AND DISPLAY

(75) Inventors: Daigo Miyasaka, Tokyo (JP); Masao Imai, Tokyo (JP); Fujio Okumura, Tokyo (JP)

(73) Assignee: Nec Corporation, Tokyo (JP)

( * ) Notice: Subject to any disclaimer, the term of this patent is extended or adjusted under 35 U.S.C. 154(b) by 927 days.

(21) Appl. No.: 12/524,410

(22) PCT Filed: Jan. 22, 2008

(86) PCT No.: PCT/JP2008/050737
§ 371 (c)(1),
(2), (4) Date: Sep. 14, 2009

(87) PCT Pub. No.: WO2008/090851
PCT Pub. Date: Jul. 31, 2008

(65) Prior Publication Data
US 2010/0085373 A1    Apr. 8, 2010

(30) Foreign Application Priority Data

Jan. 26, 2007    (JP) ................................ 2007-016903

(51) Int. Cl.
*G09G 3/36*    (2006.01)
*G09G 5/00*    (2006.01)
(Continued)

(52) U.S. Cl.
CPC .......... *G09G 5/00* (2013.01); *G09G 2340/0435* (2013.01); *H04N 2013/0463* (2013.01); *G09G 2358/00* (2013.01); *H04N 13/0438* (2013.01)
USPC ............. 348/56; 345/102; 345/204; 345/421; 345/427; 345/581; 345/589; 345/629; 345/630; 345/685; 348/49; 348/57; 348/580; 348/589; 348/663; 348/832; 382/264; 382/268; 382/276; 382/284; 713/183

(58) Field of Classification Search
None
See application file for complete search history.

(56) References Cited

U.S. PATENT DOCUMENTS 4,602,285 A * 7/1986 Beaulier et al. ................ 348/580
4,879,603 A * 11/1989 Berman ......................... 348/832
(Continued)

FOREIGN PATENT DOCUMENTS

JP    1988312788 A    12/1988
JP    1994110403 A    4/1994
(Continued)

*Primary Examiner* — Moustafa M Meky
*Assistant Examiner* — Ho Shiu
(74) *Attorney, Agent, or Firm* — Sughrue Mion, PLLC

(57) ABSTRACT

This invention is to provide an image processing apparatus, an image processing method, a program, and a display in which both of a secret image and a public image can be efficiently displayed with high picture quality without reducing contrast of the public image. One of output images is a secret image which displays an input secret image as one of input images in a partial area of a screen, all the output images including the secret image have a relationship to become, when a luminance value of each pixel thereof is totaled, an input public image as one of the input images; and during a period in which at least the secret image is being outputted, shutter glasses disposed between a display to which the image signals are inputted and user's eyes are set to a light transmission state.

7 Claims, 18 Drawing Sheets

(51) Int. Cl.
*G09G 5/02* (2006.01)
*G06F 3/038* (2013.01)
*G06T 15/40* (2011.01)
*G06T 15/20* (2011.01)
*G06K 9/40* (2006.01)
*G06K 9/36* (2006.01)
*G06K 9/20* (2006.01)
*H04N 13/02* (2006.01)
*H04N 13/04* (2006.01)
*H04N 9/74* (2006.01)
*H04N 9/77* (2006.01)
*H04N 5/72* (2006.01)

(56) References Cited

U.S. PATENT DOCUMENTS

| | | | | |
|---|---|---|---|---|
| 5,028,994 | A * | 7/1991 | Miyakawa et al. | 348/49 |
| 5,406,627 | A * | 4/1995 | Thompson et al. | 380/237 |
| 5,481,275 | A * | 1/1996 | Mical et al. | 345/698 |
| 5,488,496 | A * | 1/1996 | Pine | 349/96 |
| 5,500,686 | A * | 3/1996 | Yamaguchi et al. | 348/663 |
| 5,537,476 | A * | 7/1996 | Coteus et al. | 380/54 |
| 5,614,920 | A * | 3/1997 | Coteus et al. | 345/7 |
| 5,619,219 | A * | 4/1997 | Coteus et al. | 345/7 |
| 5,629,984 | A * | 5/1997 | McManis | 380/54 |
| 5,680,233 | A * | 10/1997 | Faris et al. | 349/61 |
| 5,684,561 | A * | 11/1997 | Yancey | 351/209 |
| 5,706,416 | A * | 1/1998 | Mann et al. | 345/427 |
| 5,710,839 | A * | 1/1998 | Cok | 382/264 |
| 5,801,697 | A * | 9/1998 | Parikh et al. | 715/790 |
| 5,828,793 | A * | 10/1998 | Mann | 382/284 |
| 5,963,371 | A * | 10/1999 | Needham et al. | 359/464 |
| 6,016,159 | A * | 1/2000 | Faris | 348/57 |
| 6,021,432 | A * | 2/2000 | Sizer et al. | 709/217 |
| 6,198,532 | B1 * | 3/2001 | Cabib et al. | 356/456 |
| 6,236,407 | B1 * | 5/2001 | Leban et al. | 345/630 |
| 6,292,092 | B1 * | 9/2001 | Chow et al. | 340/5.6 |
| 6,317,522 | B1 * | 11/2001 | Rackett | 382/268 |
| 6,377,236 | B1 * | 4/2002 | Karamoto | 345/102 |
| 6,529,209 | B1 * | 3/2003 | Dunn et al. | 345/629 |
| 6,597,328 | B1 * | 7/2003 | Stern et al. | 345/9 |
| 6,662,128 | B2 * | 12/2003 | Barbour et al. | 702/84 |
| 6,959,389 | B1 * | 10/2005 | Dunn et al. | 713/183 |
| 7,164,779 | B2 * | 1/2007 | Yerazunis et al. | 382/100 |
| 7,191,338 | B2 * | 3/2007 | Stern et al. | 713/183 |
| 7,434,060 | B2 * | 10/2008 | Dunn et al. | 713/183 |
| 7,559,660 | B2 * | 7/2009 | Wolfman et al. | 353/121 |
| 7,577,252 | B2 * | 8/2009 | Avidan et al. | 380/216 |
| 7,791,686 | B2 * | 9/2010 | Struyk | 349/74 |
| 7,804,507 | B2 * | 9/2010 | Yang et al. | 345/633 |
| 7,978,929 | B2 * | 7/2011 | Kim et al. | 382/284 |
| 8,350,920 | B2 * | 1/2013 | Nishiwaki | 348/222.1 |
| 8,446,462 | B2 * | 5/2013 | Shahraray et al. | 348/56 |
| 2001/0026248 | A1 * | 10/2001 | Goren et al. | 345/7 |
| 2002/0126229 | A1 * | 9/2002 | Niiyama et al. | 349/35 |
| 2003/0025667 | A1 * | 2/2003 | Yerazunis et al. | 345/102 |
| 2003/0038838 | A1 * | 2/2003 | Pollitt | 345/741 |
| 2003/0046537 | A1 * | 3/2003 | Smith | 713/161 |
| 2003/0122743 | A1 * | 7/2003 | Suzuki | 345/63 |
| 2003/0222884 | A1 * | 12/2003 | Ikeda et al. | 345/589 |
| 2003/0231192 | A1 * | 12/2003 | Kaneyasu | 345/690 |
| 2005/0212720 | A1 * | 9/2005 | Rothman et al. | 345/8 |
| 2005/0219269 | A1 * | 10/2005 | Sakashita | 345/685 |
| 2005/0259089 | A1 * | 11/2005 | Yamazaki et al. | 345/204 |
| 2006/0126156 | A1 * | 6/2006 | Evans et al. | 359/320 |
| 2006/0187230 | A1 * | 8/2006 | Jung et al. | 345/581 |
| 2006/0221007 | A1 * | 10/2006 | Kim | 345/76 |
| 2006/0221067 | A1 * | 10/2006 | Kim et al. | 345/204 |
| 2006/0232606 | A1 * | 10/2006 | Kim et al. | 345/620 |
| 2007/0040780 | A1 * | 2/2007 | Gass et al. | 345/87 |
| 2007/0121012 | A1 * | 5/2007 | Hida et al. | 348/589 |
| 2007/0252832 | A1 * | 11/2007 | Ratai | 345/427 |
| 2008/0144967 | A1 * | 6/2008 | Struyk | 382/276 |
| 2009/0146941 | A1 * | 6/2009 | Fujine et al. | 345/102 |

FOREIGN PATENT DOCUMENTS

| | | |
|---|---|---|
| JP | 1994118927 A | 4/1994 |
| JP | 1994186506 A | 7/1994 |
| JP | 2001255844 A | 9/2001 |
| JP | 2006162929 A | 6/2006 |
| WO | 2008015905 A | 2/2008 |

* cited by examiner

F I G. 6
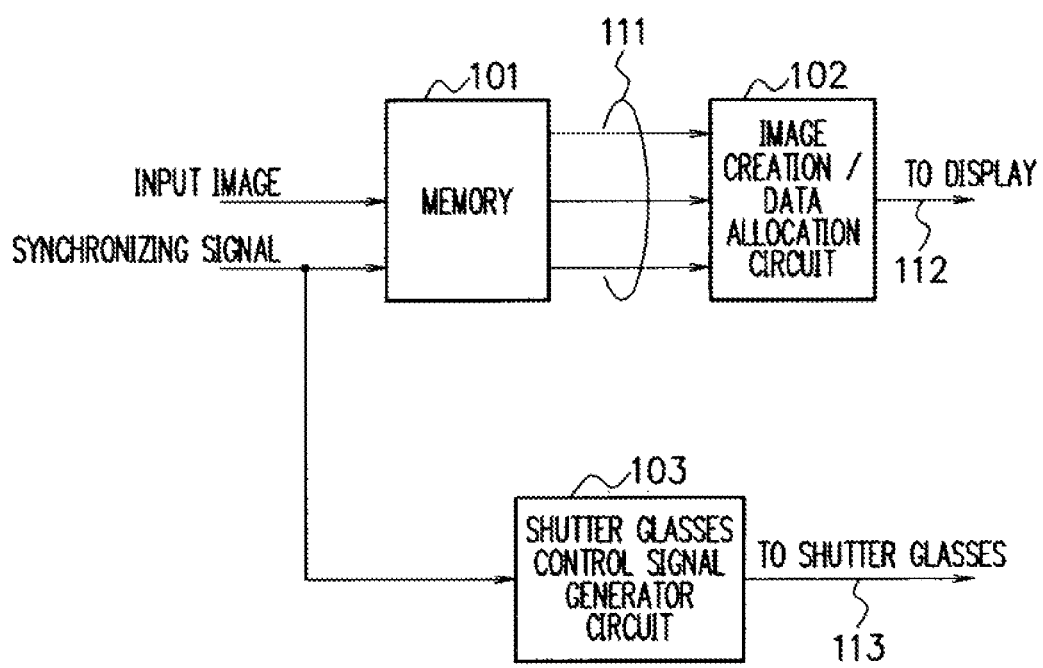

F I G. 13
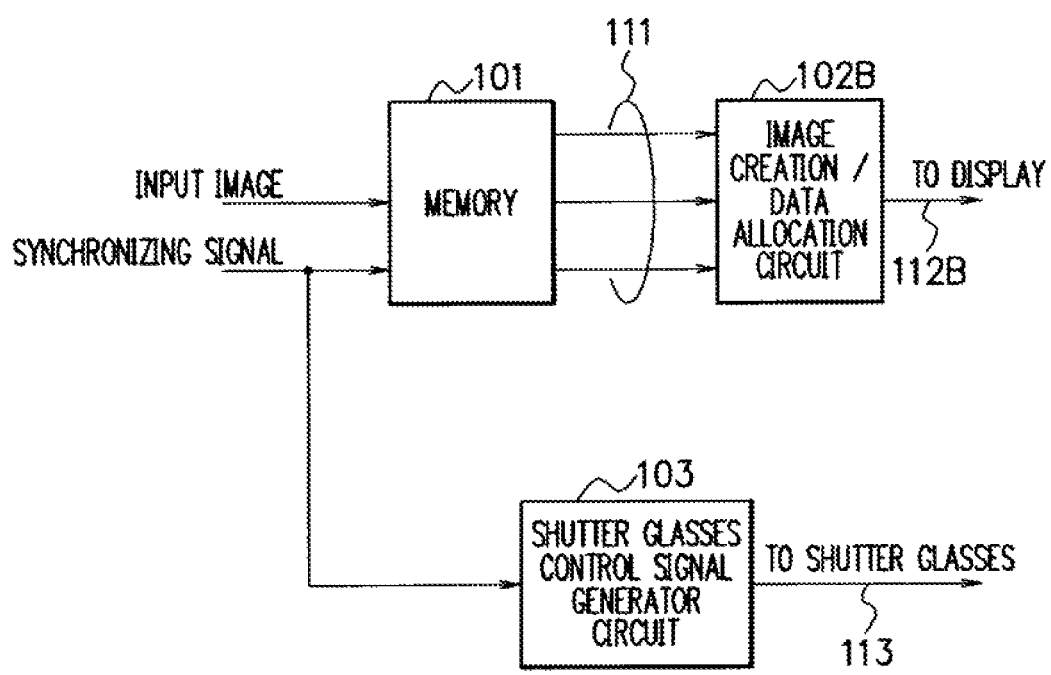

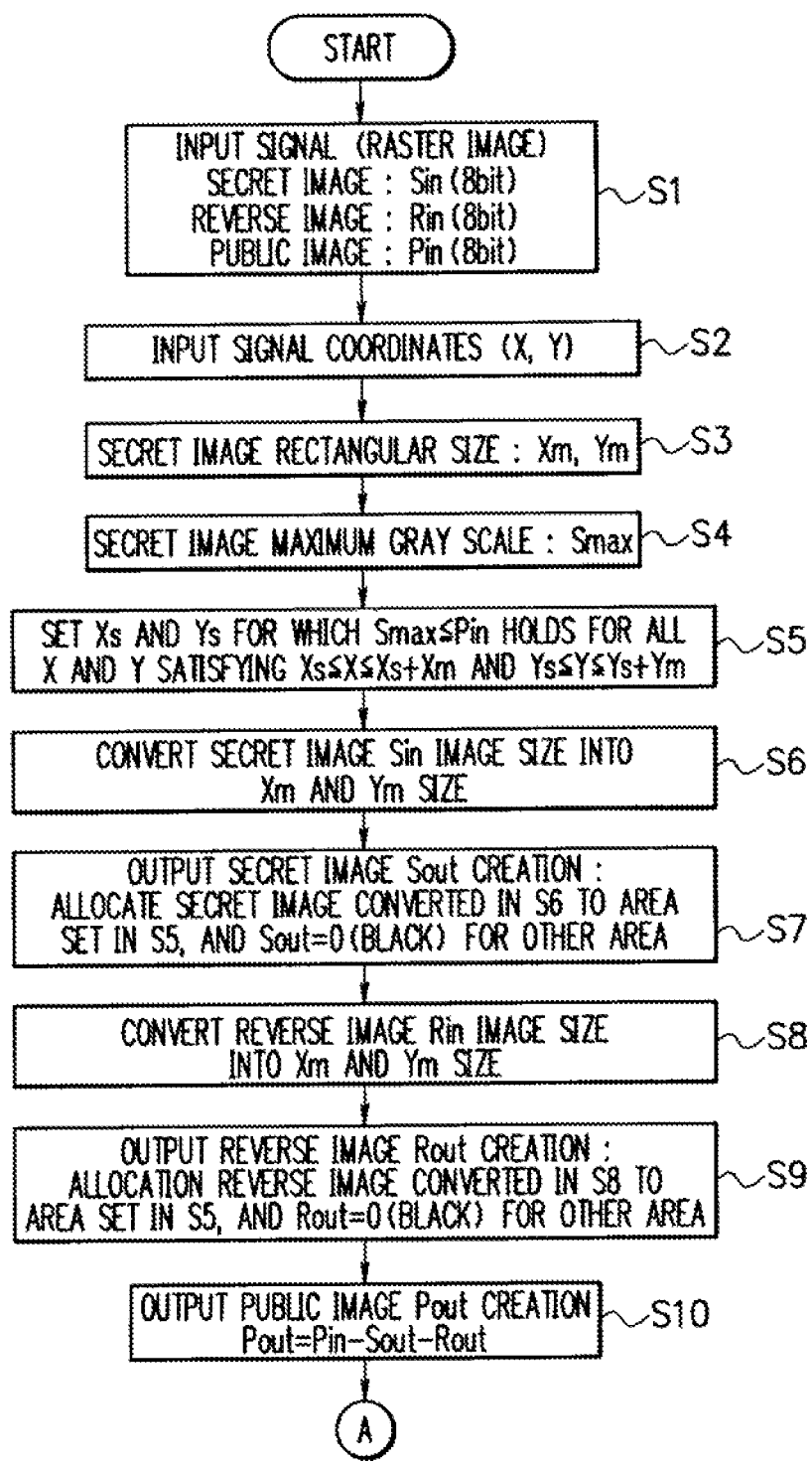

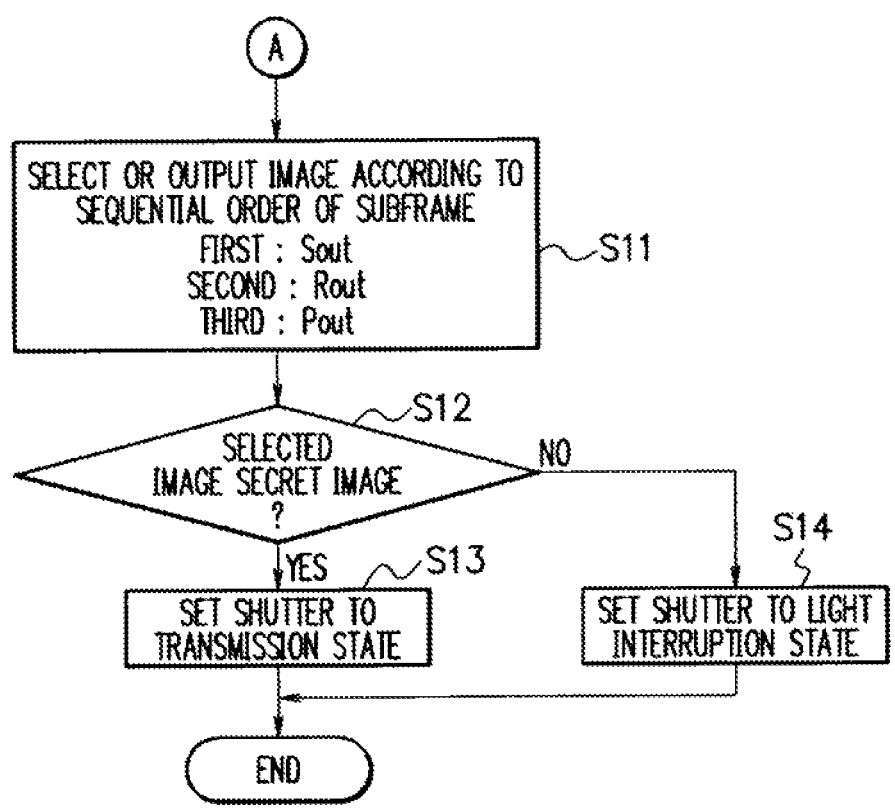

_US 8,848,044 B2_

IMAGE PROCESSING APPARATUS, METHOD, PROGRAM AND DISPLAY

This application is the National Phase of PCT/JP2008/050737, filed Jan. 22, 2008, which is based upon and claims the benefit of priority from Japanese patent application No. 2007-016903, filed on Jan. 26, 2007, the disclosure of which is incorporated herein in its entirety by reference.

TECHNICAL FIELD

The present invention relates to an image processing apparatus and a display, and in particular, to an apparatus and a system for presenting the contents to a particular user and an authenticated person.

RELATED ART

Flat panel displays such as a liquid-crystal display and a plasma display are widely applied to apparatuses ranging from mobile apparatuses such as a mobile phone terminal to large-sized apparatuses such as a public display installed in a street. Most of these displays are developed by placing emphasis on a wide viewing angle, high luminance, and high picture quality, and it is required that images on the displays can be easily and beautifully viewed from any angle.

On the other hand, the contents presented on the displays include contents such as secret information and private data which are not desired to be viewed by the other persons. Hence, in the present state in which the ubiquitous environment is under progress with the development of information apparatuses, it is an important issue to prevent the displayed content from being viewed by any other person even in the public where unspecified persons are present.

Further, even in a place such as an office where only particular persons are present, the user handling secret information may desire in some cases that the information is not viewed by the person passing behind the seat of the user.

In some mobile phone terminals, there is disposed a display in which by arranging an optical light interrupting plate (louver), the content displayed can be visually recognized only from a particular direction. However, since a glance at the displayed content can also be stolen from just behind the user, the content cannot be sufficiently kept secret.

A technique associated with removal of these problems is "image display" disclosed in Patent Document 1. This image display is an apparatus in which when a user wears glasses having an image selecting function, only the user can visually recognize a particular image (to be referred to as a secret image hereinbelow), and another image (to be referred to as a public image hereinbelow) is presented to the other persons.

Specifically, an imaging apparatus shown in FIG. 1 stores a one-frame input image signal 11 in an image information storing memory 12 according to a frame signal 13. Thereafter, the apparatus reads image information from the memory 12 at a speed which is half the frame period (namely, twice during a period of one frame); compresses the first readout signal into half the original size thereof to deliver it as a first image signal 14 to a mixing circuit 15; and converts chroma and luminance of the next readout image signal to feed it as a second image signal 17 to the mixing circuit 15. Hence, the images associated with the first and second image signals 14 and 17 are alternately displayed on an image display 18.

On the other hand, the frame signal 13 is also fed to a glasses shutter timing generator 19. The timing generator 19 drives a shutter of a pair of glasses 21, namely, controls the shutter to prevent the user from viewing the image associated with the second image signal 17.

Due to such structure and operation, the person without the glasses 21 views a composite image of the first and second image signals 14 and 17, i.e., a third image (public image) not associated with the first image signal, and the person with the glasses 21 views a desired image (secret image) resultant from the first image signal 14.

Also, another related technique to solve the problems above is "Secure method for providing privately viewable data in a publicly viewable display" disclosed by Patent Document 2. According to the method disclosed by Patent Document 2, only the granted user can interpret the private image (secret image) on the display, and the person not granted views an image, e.g., simply a random pattern, a pattern which cannot be easily interpreted, or a screen saver image.

To encourage the object, the invention disclosed by Patent Document 2 synchronizes the image processing method including a data concealing pattern and an alternating pattern with a display in which an image created by an image processing technique is incorporated (e.g., combines the method with a wearable device such as active glasses). Finally, "the known ability to fuse dissimilar images into one single image" of the visual system of the human completes ability to provide data which can be privately viewed by a display available for the public.

Further, a technique related to the displaying personal information in a partial area of a public display by securing secrecy is "information display" disclosed by Patent Document 3. According to the display disclosed by Patent Document 3, when a filter to limit the viewing angle is arranged on a display screen of a display section, the arranging area is detected to set, as a display area R1, an area in which the filter is not disposed on the display screen and to set, as a display area R2, an area in which the filter is arranged on the display screen. And general content is displayed in the display area R1 and content for an individual is displayed in the display area R2.

Patent Document 1: Japanese Patent Laid-Open Pub. No. Sho 63-312788
Patent Document 2: Japanese Patent Laid-Open Pub. No. 2001-255844
Patent Document 3: Japanese Patent Laid-Open Pub. No. 2006-162929

DISCLOSURE OF THE INVENTION

Problem to be Solved by the Invention

However, in the inventions disclosed by Patent Documents 1 and 2, the public image has a low degree of freedom, and the public images which can be presented are not quite meaningful images such as a flat gray image and a random pattern. If it is desired to present a meaningful image as the public image, since gray is superimposed onto the image, the result has low contrast and floating black level is emphasized, which deteriorates picture quality.

Also, since the public image cannot be displayed during the display period of the secret image, the public image becomes lower in brightness when compared with that in the ordinary use and light utilization efficiency is deteriorated.

Additionally, in the invention disclosed by Patent Document 3, the area to display content for an individual cannot be used by other persons and the personal information can be confirmed only from a particular position, which is troublesome for the user. Moreover, since only control of the viewing angle is carried out, the problem that the personal information can be viewed from just behind the user is not solved.

The present invention has been devised in consideration of the problems above and aims to provide an image processing apparatus, an image processing method, a program, and a display in which both of a secret image and a public image can be efficiently displayed with high picture quality without reducing contrast of the public image.

Means for Solving the Problem

To achieve the above exemplary object, according to a first exemplary aspect of the present invention, there is provided an image processing apparatus associated with either one of the configurations A-1 to A-3 described below.

A-1: An image processing apparatus for creating two or more kinds of image signals using at least two kinds of input images and sequentially outputting the image signals therefrom, characterized in that one of the image signals is a first image signal which displays a first input image as one of the input images in a partial area of a screen, all the image signals including the first image signal have a relationship to become, when a luminance value of each pixel thereof is totaled, a second input image which is one of the input images; and the apparatus comprises optical shutter control means for controlling, during a period in which at least the first image signal is being outputted, a shutter disposed between a display to which the image signals are inputted and user's eyes to set the shutter to a light transmission state.

A-2: An image processing apparatus for creating two or more kinds of image signals using at least two kinds of input images and sequentially outputting the image signals therefrom, characterized by comprising first image creation means for creating, as one of the image signals, a first image signal which displays a first input image as one of the input images in a partial area of a screen; second image creation means for creating a second image signal as one of the image signals such that when a luminance value of each pixel of all the image signals including the first image signal is totaled, there is obtained a second input image which is one of the input images; and optical shutter control means for controlling, during a period in which at least the first image signal is being outputted, a shutter disposed between a display to which the image signals are inputted and user's eyes to set the shutter to a light transmission state.

A-3: An image processing apparatus for creating two or more kinds of image signals using at least two kinds of input images and sequentially outputting the image signals therefrom, characterized in that a first image signal as one of the image signals is a signal which displays a first input image as one of the input images only in a partial area of a screen, by use of a luminance value obtained by multiplying the original luminance value for each pixel by a modulation degree of less than one; all the image signals including the first image signal have a relationship to become, when a luminance value of each pixel thereof is totaled, a second input image which is one of the input images; and the apparatus comprises optical shutter control means for controlling, during a period in which at least the first image signal is being outputted, a shutter disposed between a display to which the image signals are inputted and user's eyes to set the shutter to a light transmission state.

In each configuration of the first exemplary aspect of the present invention, it is favorable that the first input image is displayed in an area in which the luminance value of the second input image is equal to or more than a predetermined value. Or, it is favorable that the first input image is displayed in a predetermined area.

In each configuration of the first exemplary aspect of the present invention, it is favorable that the optical shutter control means controls the shutter to set the shutter to a light interruption state during a period in which an image signal other than the first image signal is being outputted. Or, one of the image signals is favorably a third image signal which displays a reverse image of the first input image in a partial area of the screen; in addition, one of the image signals favorably takes a value obtained by subtracting a total value of the first and third image signals from second image signal.

Further, to achieve the above exemplary object, according to a second exemplary aspect of the present invention, there is provided an image processing method associated with either one of B-1 to B-3 described below.

B-1: An image processing method of creating two or more kinds of image signals using at least two kinds of input images and sequentially producing the image signals, characterized in that one of the image signals is a first image signal which displays a first input image as one of the input images in a partial area of a screen, all the image signals including the first image signal have a relationship to become, when a luminance value of each pixel thereof is totaled, a second input image which is one of the input images; and the method comprises an optical shutter control step of controlling, during a period in which at least the first image signal is being outputted, a shutter disposed between a display to which the image signals are inputted and user's eyes to set the shutter to a light transmission state.

B-2: An image processing method of creating two or more kinds of image signals using at least two kinds of input images and sequentially producing the image signals, characterized by comprising a first image creation step of creating, as one of the image signals, a first image signal which displays a first input image as one of the input images in a partial area of a screen; a second image creation step of creating a second image signal as one of the image signals such that when a luminance value of each pixel of all the image signals including the first image signal is totaled, there is obtained a second input image which is one of the input images; and an optical shutter control step of controlling, during a period in which at least the first image signal is being outputted, a shutter disposed between a display to which the image signals are inputted and user's eyes to set the shutter to a light transmission state.

B-3: An image processing method of creating two or more kinds of image signals using at least two kinds of input images and sequentially producing the image signals, characterized in that a first image signal as one of the image signals is a signal which displays a first input image as one of the input images only in a partial area of a screen, by use of a luminance value obtained by multiplying the original luminance value for each pixel by a modulation degree of less than one; all the image signals including the first image signal have a relationship to become, when a luminance value of each pixel thereof is totaled, a second input image which is one of the input images; and the method comprises an optical shutter control step of controlling, during a period in which at least the first image signal is being outputted, a shutter disposed between a display to which the image signals are inputted and user's eyes to set the shutter to a light transmission state.

In each of the above methods of the second exemplary aspect of the present invention, it is favorable that the first input image is displayed in an area in which the luminance value of the second input image is equal to or more than a predetermined value. Or, the first input image is favorably displayed in a predetermined area.

In each of the above methods of the second exemplary aspect of the present invention, it is favorable that the optical shutter control step controls the shutter to set the shutter to a light interruption state during a period in which an image signal other than the first image signal is being outputted. Moreover, one of the image signals is favorably a third image signal which displays a reverse image of the first input image in a partial area of the screen; additionally, one of the image signals favorably takes a value obtained by subtracting a total value of the first and third image signals from second image signal.

Also, to achieve the above exemplary object, according to a third exemplary aspect of the present invention, there is provided an image processing program, characterized by making a computer execute either one of the image processing methods of the second exemplary embodiment of the present invention.

In addition, to achieve the above exemplary object, according to a fourth exemplary aspect of the present invention, there is provided a display associated with either one of the configurations of C-1 to C-3 described below.

C-1: A display for sequentially displaying, by display means, images corresponding to two or more kinds of image signals created using at least two kinds of input images, characterized in that one of the image signals is a first image signal which displays a first input image as one of the input images in a partial area of the display means, all the image signals including the first image signal have a relationship to become, when a luminance value of each pixel thereof is totaled, a second input image which is one of the input images; and the display comprises optical shutter control means for controlling, during a period in which at least the first image signal is being outputted, a shutter disposed between the display means and user's eyes to set the shutter to a light transmission state.

C-2: A display for sequentially displaying, by display means, images corresponding to two or more kinds of image signals created using at least two kinds of input images, characterized by comprising first image creation means for creating, as one of the image signals, a first image signal which displays a first input image as one of the input images in a partial area of the display means; second image creation means for creating a second image signal as one of the image signals such that when a luminance value of each pixel of all the image signals including the first image signal is totaled, there is obtained a second input image which is one of the input images; and optical shutter control means for controlling, during a period in which at least the first image signal is being outputted, a shutter disposed between the display means and user's eyes to set the shutter to a light transmission state.

C-3: A display for sequentially displaying, by display means, images corresponding to two or more kinds of image signals created using at least two kinds of input images, characterized in that a first image signal as one of the image signals is a signal which displays a first input image as one of the input images only in a partial area of the display means, by use of a luminance value obtained by multiplying the original luminance value for each pixel by a modulation degree of less than one; all the image signals including the first image signal have a relationship to become, when a luminance value of each pixel thereof is totaled, a second input image which is one of the input images; and the display comprises optical shutter control means for controlling, during a period in which at least the first image signal is being outputted, a shutter disposed between the display means and user's eyes to set the shutter to a light transmission state.

In each configuration of the fourth exemplary aspect of the present invention, it is favorable that the first input image is displayed in an area in which the luminance value of the second input image is equal to or more than a predetermined value. Or, the first input image is favorably displayed in a predetermined area of the display means.

In each configuration of the fourth exemplary aspect of the present invention, it is favorable that the optical shutter control means controls the shutter to set the shutter to a light interruption state during a period in which an image signal other than the first image signal is being outputted. Also, one of the image signals is favorably a third image signal which displays a reverse image of the first input image in a partial area of the screen; in addition, one of the image signals favorably takes a value obtained by subtracting a total value of the first and third image signals from second image signal.

Advantages of the Invention

In accordance with the present invention, it is possible to provide an image processing apparatus, an image processing method, a program, and a display in which both of a secret image and a public image can be efficiently displayed with high picture quality without reducing contrast of the public image.

BEST MODE FOR CARRYING OUT THE INVENTION

[Principle of Invention]

The gray component of the public image taking place in the associated techniques described above is an image obtained by adding, to the secret image, a luminance reverse image for each color component of the secret image, which is produced to prevent the person not wearing the glasses from viewing the secret image. Hence, as a method of reducing the gray component to suppress the emphasized floating black level in the public image, there can be considered an operation to lower luminance of the secret image.

However, in the conventional scheme in which a secret image, its reverse image, and a public image are presented for each frame, it is not possible to superimpose any other image thereonto when the secret image is being presented; resultantly, the more the luminance of the secret image is reduced, the darker the secret image is, which leads to a problem of low contrast of the image.

FIG. 2 shows a sequential display example of a secret image and a public image in the prior art. In FIG. 2, the abscissa indicates time and the ordinate indicates luminance; an arbitrary period (a one-frame period) is divided into a plurality of subframes to sequentially display a secret image S, a reverse image R, and a public image P.

The reverse image R is set such that a result of an addition thereof to the secret image S for each pixel is a gray image which is an image not having any correlation with the secret image S (here, a grapy image is employed as an example of the image not having the correlation; this however is not limitative, but the reverse image R may be set such that there is obtained an image having another correlation, for example, a random display image may be employed). By setting the reverse image in this fashion, a luminance integration result of the image for the one-frame period is an integrated image of the public image P and the gray image; hence, the person not wearing the shutter glasses cannot view the secret image, but can visually recognize only the public image P. On the other hand, the person wearing the shutter glasses synchronized with this display operation can perceive only the secret image S since the shutter interrupts light during the display period of the reverse image R and the public image P.

FIG. 3 shows an example in which the maximum luminance of the secret image is reduced to half the original value. By setting the maximum luminance of the secret image to half the original value, the maximum luminance necessary for the reverse image is also half the original value, namely, 0.5S and 0.5R, respectively. And by assigning the public image to the remaining luminance component of the reverse image display period, the luminance of the public image component can be increased. On the other hand, the public image cannot be assigned to the remaining luminance component of the secret image display period. This is because if the public image is assigned thereto, the person wearing the shutter glasses views the integrated image of the secret image and the public image.

It can be seen that the ratio of the remaining luminance component during the secret image display period is remarkably greater when the luminance component of the secret image is lowered, and the secret image is darker.

To cope therewith in accordance with the present invention, as another method of suppressing the emphasized floating black level in the public image, the area to display the secret image is set to a bright area in the public image.

That is, a bright area is detected in the public image, and the secret image is displayed in the detected area during the secret image display period. And during the public image display period, the public image is displayed in the detected area by subtracting the luminance corresponding to that used to display the secret image from the luminance of the public image; hence, the contrast of the public image perceived by the person not using the shutter is not reduced and the person using the shutter can browse the secret image. That is, the secret image is not displayed in a dark area of the public image, namely, the black display operation is conducted; it is resultantly possible to suppress the addition of luminance in the "black" area of the public image, and the contrast is not reduced.

FIG. 4 shows a sequential display example of a secret image and a public image in accordance with the present invention. FIG. 4 is an example in which of the secrete, reverse, and public images like those of FIG. 3, the secret image and the reverse image are displayed in a bright area of the public image. First, a bright area is detected in the public image to set the area as a secret image display area (a lower-left area of the screen in this example). Next, the secret image is displayed in the area according to the size thereof, and the reverse image is also displayed according to the size of the secret image. And the public image is displayed in the secret image area by subtracting the added result of luminance of the secret and reverse images from the luminance of the public image, and the public image is directly displayed in the other area.

Description will be given in detail of a flow of the display operation of the secret image area and the other area. In the secret image display area shown in FIG. 4(a), the secret image S and the reverse image R are sequentially displayed. And during the public image display period, an image (P−S−R) obtained by subtracting the secret image S and the reverse image R from the public image P is displayed. As a result, the image perceived by the person without the shutter is the public image P which is a value resultant from an addition of the secret image S, the reverse image R, and (P−S−R); hence, the gray image is not added to the public image as in the conventional scheme shown in FIGS. 2 and 3. Further, as shown in FIG. 4(b), the "black" display operation is employed in the other area during the display period of the secret image S and the reverse image R; hence, the image perceived by the person without the shutter is the public image. Therefore, in both of (a) secret image display area and (b) other area, the image perceived by the person without the shutter is the public image, and the contrast is not lowered. On the other hand, the person with the shutter can visually recognize only the secret image as in FIGS. 2 and 3.

Meanwhile, for the reverse image and the public image, the display period need not be differently allocated as shown in FIG. 5. When only the secret image is desired to be viewed by use of the shutter glasses, light is interrupted for the reverse and public images, and hence the image to be perceived is not affected; for the person not wearing the shutter glasses, the reverse and public images are integrated on the retinae and hence the display result is not affected regardless of whether or not the display period is differently allocated. Incidentally, FIG. 5 shows an example in which the display period is not differently allocated only for (a) secret image area, but it is naturally possible that the display period is not differently allocated for (b) other area for the similar reason.

Here, for the secret image area of the public image, there is employed a value obtained by subtracting the secret image S from the public image P; however, if the value is less than zero, it is likely that also the person without the shutter views the secret image. In such case, it is only necessary to reduce the luminance of the secret image to be lower than that of the public image.

Moreover, in accordance with the present invention, the transmission period of the shutter glasses may be set not only to the secret image display period, but also to the display period of the secret and public images. Through the browsing of the public and secret images in the overlapped fashion, it is possible that supplementary information of the public image is presented as the secret image to the person wearing the shutter glasses.

Incidentally, according to the present invention, when the display operation of the secret image is not achieved by use of the shutter glasses, the display period allocated to the secret image may be adopted for the display operation of the public image. By disposing such switching means, it is possible that the display operation of the secret image is carried out only when it is required to thereby maximize light utilization efficiency.

In accordance with the above method, by applying the method to an apparatus described below, both of the secret image and the public image can be displayed with high picture quality and with high performance.

First, the image processing apparatus detects a bright area in the public image, mixes a secret image with a reverse image to be displayed in the area, and subtracts a result of an addition of the secret image and the reverse image from the original public image to produce a new public image; hence, it is possible to display both of the secret image and the public image with high light utilization efficiency.

Additionally, the display executes processing in which a bright area is detected in the public image, and a secret image and a reverse image to be displayed in the area are mixed with each other, and a result of an addition of the secret image and the reverse image is subtracted from the original public image to produce a new public image; and the secret, reverse, and public images are sequentially displays; hence, it is possible to display both of the secret image and the public image with high picture quality and with high performance.

Next, description will be given of favorable modes of exemplary embodiment the present invention based on the principle described above.

[First Exemplary Embodiment]

Description will be given of a first exemplary embodiment in which the present invention is favorably applied. FIG. 6 shows structure of an image processing apparatus in accordance with this exemplary embodiment. This image processing apparatus includes a memory 101, an image creation/data allocation circuit 102, and a shutter glasses control signal generator circuit 103.

The memory 101 stores a secret image, a reverse image, and a public image sequentially inputted from an external device. The image creation/data allocation circuit 102 creates; by use of an output secret image, an output reverse image, and an output public image sequentially delivered from the memory 101 according to a synchronizing signal; an output secret image by setting the secret image in a secret image area set in advance and then creates an output public image by subtracting the secret image from the public image. The shutter glasses control signal generator circuit 103 controls a light transmission state and a light interruption state of the shutter glasses based on a synchronizing signal inputted thereto.

In FIG. 6, the output signal from the memory 101 is indicated by a numeral 111, that from the image creation/data allocation circuit 102 is designated by a numeral 112, and that from the shutter glasses control signal generator circuit 103 is represented by a numeral 113.

The secret image, the reverse image, and the public image stored in the memory 101 are fed to the image creation/data allocation circuit 102. The image creation/data allocation circuit 102 detects a bright area in the public image, sets the secret image in the detected area, and creates an output public image by subtracting the secret image from the public image; thereafter, the image creation/data allocation circuit 102 conducts data allocation to the output secret image, the output reverse image, and the output public image to output the images to a display, not shown.

FIG. 7 shows a configuration of the image creation/data allocation circuit 102. The image creation/data allocation circuit 102 includes a data allocation circuit 121, a detector circuit 122, and an output image creation circuit 123. The detector circuit 122 detects a bright area in the public image to set the area as a secret image display area. The secret, reverse, and public images delivered to the image creation/data allocation circuit 102 are processed to be sent from the output image creation circuit 123 to the data allocation circuit 121 as "output secret image" and "output reverse image" to display, according to the secret image display area set by the detector circuit 122, a secret image and a reverse image in the secret image display area and to conduct the "black" display operation in the other area. Also "output public image" created by subtracting a value of an addition of the secret image and the reverse image in the secret image area from the public image is fed to the data allocation circuit 121.

The detector circuit 122 sets a secret image display area based on the inputted public image. The first setting method is a method in which the brightest rectangular area is detected by use of gray scale values of respective pixels of the public image and the area is used as the secret image display area. The rectangular area size is required to be sufficient to judge the contents of the secret image. In this case, when a public image is inputted and the smallest rectangular size and the lowest necessary brightness are designated, the secret image display area is automatically determined.

The second setting method is a method of setting the rectangular area in advance. In this situation, there exists a case (in which the subtraction result of the secret image is less than zero) wherein the output image creation circuit 123 cannot create the output public image depending on the gray scale values of the public image; hence, it is favorable to employ a method in which, for example, the minimum gray scale value of the public image or the maximum gray scale value of the secret image in the beforehand set rectangular area is set in advance (the second setting method will be described in detail in conjunction with the third exemplary embodiment).

The third setting method is a combination of the first and second setting methods.

As above, for the method in which the detector circuit 122 sets the secret image display area if the gray scale value as a result of the subtraction of the output secret image from the public image is not less than zero, the display area may be arbitrarily set, for example, the area is set on the basis of the luminance distribution of the public image or the area is set in advance.

The output image creation circuit 123 creates the output secret, reverse, and public images on the basis of the secret image display area set by the detector circuit 122. The secret image is converted in size to be displayed in the secret image display area, and the output secret image is produced by setting the "black" display operation to the other area. The output reverse image is also created in the similar way as for the output secret image. The output public image is an image which is obtained by subtracting a result of an addition of the output secret image and the output reverse image from the public image. The generated image data is fed to the data allocation circuit 121. Here, the output signal from the output image creation circuit 123 is indicated by a numeral 114.

FIG. 8 shows an example of a timing chart for the one-frame period of the output signal 112 from the image creation/data allocation circuit 102, the output signal 113 from the shutter glasses control signal generator circuit 103, and the output signal 114 from the output image creation circuit 123. Description will be given of processing in the data allocation circuit 121 based on this timing chart.

The data allocation circuit 121 receives as inputs thereto the output secret, reverse, and public images, conducts data allocation for the secret image during a period Ton, and conducts data allocation for the reverse and public images during a period off. During the period Ton, a gray scale value of the S image as the output secret image is sent to each pixel of the screen of the display during a data write period W. Thereafter, until the next write period W, the data allocation circuit 121 keeps a light-emission or no-light-emission state of pixels (for emissive displays such as a plasma display and an organic electroluminescence display) or a light transmission or light-interruption state of pixels (for non-emissive displays such as a display using an MEMS switch and a liquid-crystal display).

Next, also during Toff, the data allocation circuit 121 conducts data allocation to the output reverse image R and the output public image P through the similar process as for the output secret image (the write process and the light-emission or light transmission state keeping process) to reproduce gray scales for the respective images.

The output signal 113 fed to the shutter glasses is a signal which sets the shutter glasses to the light transmission state during the period Ton and to the light interruption state during the period Toff. The output signal 113 is generated by the shutter glasses control signal generator circuit 103 based on a video synchronizing signal.

Incidentally, although the data allocation circuit 121 produces the output secret image S, the output reverse image R, and the output public image P during the one-frame period, these signals may be created basically in an arbitrary sequence. For example, as shown in FIG. 9, even if the output periods of the output reverse image R and that of the output public image P are exchanged, the image perceived by the person wearing the shutter glasses does not differ from that perceived by the person not wearing the shutter glasses as shown in the timing chart of FIG. 8. Similarly, during the display period of the output secret image S, if the output signal 113 is created from the shutter glasses control signal generator circuit 103 to set the shutter glasses to the light transmission state, the secret, reverse, and public images may be in an arbitrary order.

Here, although description has been given of an example wherein the detector circuit 122 detects the secret image display area based on only the public image, it is naturally possible that the display area is set with higher precision if brightness of the secret area is known. Hence, it is also possible to detect the secret image display area by inputting not only the public image, but also the secret image to the detector circuit 122.

Additionally, the transmission period of the shutter glasses is not limited to the display period of the secret image, but the display periods of the secret and public images may be set as the transmission period. Through the browsing of the public and secret images in an overlapped fashion, supplementary information of the public image may be presented as the secret image to the person wearing the shutter glasses. In the example of FIG. 4, it is possible that letter "A" in white in the lower-left corner of the secret image is combined in a black rectangle in the lower-left corner of the public image and is then perceived by the user.

As above, the secret image display area is set by the image creation/data allocation circuit 102 to display the secret image in the area and the public image is an image created by subtracting the secret image in the display area therefrom; it is hence possible to suppress the reduction in contrast of the public image, and both of the secret and public images can be displayed with high picture quality and with high performance.

[Second Exemplary Embodiment]

Description will be given of a second exemplary embodiment in which the present invention is favorably applied. FIG. 10 shows a configuration of an image processing apparatus in accordance with the present exemplary embodiment. The image processing apparatus in accordance with the present exemplary embodiment is almost the same in structure as the image processing apparatus in accordance with the first exemplary embodiment, but differs from the first exemplary embodiment in that a reverse image creation section 104 is included. The section 104 receives a secret image as an input to produce a reverse image.

The reverse image creation section 104 creates, as a reverse image to cancel the secret image, values (such as gray scales) corresponding to luminance which is luminance in the "white" display operation of the secret image when the reverse image is added to the secret image. The reverse image is generated on the basis of luminance because an image is perceived on the retinae by integrating the luminance, not the gray scales. By producing such reverse image, it is not required to store the reverse image in the memory 101, and hence the capacity of the memory 101 can be reduced.

Due to the structure described above, it is possible to attain an advantage similar to that of the first embodiment by reducing the amount of image data to be stored in the memory.

[Third Exemplary Embodiment]

Description will be given of a third exemplary embodiment in which the present invention is favorably applied. FIG. 11 shows structure of an image processing apparatus in accordance with the present exemplary embodiment. This image processing apparatus is almost the same as the image processing apparatus in accordance with the first exemplary embodiment, but differs therefrom in the contents of processing in an image creation/data allocation circuit 102A. According to the present exemplary embodiment, the secret image display area is beforehand set to set an image therein such that the person not wearing the shutter cannot perceive the secret image. This corresponds to the second setting method of the display area setting methods in the first exemplary embodiment.

FIG. 12 shows a configuration of the image creation/data allocation circuit 102A. The image creation/data allocation circuit 102A includes an output image creation circuit 123A and a data allocation circuit 121A. Unlike the first exemplary embodiment, the detector circuit is not included. The public image display area is delivered as a preset value to the output image creation circuit 123A. The image creation/data allocation circuit 102A produces an output signal 112A, which is fed to a display, not shown.

The output image creation circuit 123A executes processing almost the same as that of the output image creation circuit 123 of the first exemplary embodiment; however, since the public image display area is beforehand set, if the value of the pixels of the secret image is more than that of the pixels in the secret image display area of the public image, the output image creation circuit 123A executes processing to reverse the relationship in magnitude therebetween, for example, by multiplying all values of the public image by a fixed number more than one or by multiplying all values of the secret image by a fixed number less than one. This sets an output public image such that the person not wearing the shutter glasses cannot perceive the secret image. The data allocation circuit 121A is similar to the data allocation circuit 121 of the first exemplary embodiment.

Since the other operations are similar to those of the first exemplary embodiment, duplicated description thereof will be avoided.

As above, also by beforehand setting a partial area of the secret image, there can be attained an advantage similar to that of the first exemplary embodiment.

[Fourth Exemplary Embodiment]

Description will be given of a fourth exemplary embodiment in which the present invention is favorably applied. FIG. 13 shows structure of an image processing apparatus in accordance with the present exemplary embodiment. This image processing apparatus is almost the same as the image processing apparatus in accordance with the first exemplary embodiment, but differs therefrom in the contents of processing in an image creation/data allocation circuit 102B. In the present exemplary embodiment, the reverse image is not clearly discriminated from the public image, but a composite image thereof is treated as one image to which data is to be allocated.

FIG. 14 shows a timing chart including an output signal 112B from a data allocation circuit 102B of the present exemplary embodiment. The difference from the timing chart of the image processing apparatus in accordance with the first exemplary embodiment resides in that an image is represented by use of an added image PR2,PR1 of the reverse image R and the public image P.

The value of PR2,PR1 is obtained through an arithmetic operation of PR1+PR2=R+(P−R−S)=P−S. That is, the output public image which is an image attained by subtracting the output secret image from the public image is divided into two images to be displayed. It can be considered that the first exemplary embodiment is an example of the division in a case wherein PR1=R and PR2=P−R−S. It can be assumed based on the relational expressions that the reason why the value of PR1,PR2 is not restricted by the example of the first exemplary embodiment, but may be arbitrarily selected is that when only the secret image is perceived by use of the shutter glasses, light is interrupted for the reverse and public images and hence the images do not affect the display operation, and for the person not wearing the shutter glasses, the reverse and public images are integrated on the retinae. In short, the reverse and public images do not affect the display operation regardless of whether or not the different display period is assigned thereto.

The other operations are similar to those of the first exemplary embodiment, and hence duplicated description thereof will be skipped.

Meanwhile, since the image processing apparatus in accordance with the present exemplary embodiment is an equivalent system of the image processing apparatus in accordance with the first exemplary embodiment, it goes without saying that a similar advantage is obtained.

[Fifth Exemplary Embodiment]

Description will be given of a fifth exemplary embodiment in which the present invention is favorably applied. FIG. 15 shows a configuration of a display in accordance with the present exemplary embodiment. The display scheme is not particularly restricted, but there may be employed a plasma display, a display adopting an MEMS switch; an organic electroluminescence display, a fast liquid-crystal display, and the like.

This display includes a memory 201, a display controller 105, a shutter glasses control signal generator circuit 203, and a display section 106. The memory 201 stores a secret image, a reverse image, and a public image sequentially inputted thereto. The display controller 105 creates; by use of an output secret image, an output reverse image, and an output public image sequentially delivered from the memory 101 according to a synchronizing signal; an output secret image by setting the secret image in a secret image area set in advance and creates an output public image by subtracting the secret image from the public image; allocates data thereto to be displayed by the display section 106, and creates a control signal and an image signal to drive the display section 106. The shutter glasses control signal generator circuit 203 controls a light transmission state and a light interruption state of the shutter glasses based on a synchronizing signal inputted thereto. An output signal 211 from the memory 201, an output signal 212 from the display controller 105, and an output signal 213 from the shutter glasses control signal generator circuit 203 are respectively similar to the output signals 111, 112, and 113 of the first exemplary embodiment.

As in the present exemplary embodiment, it is possible, by incorporating the processing of the image creation/data allocation circuit 102 of the first exemplary embodiment in the display controller 105, to integrally install the image creation/data allocation processing in the display.

Due to the structure described above, there can be realized a display capable of displaying also the secret image with high picture quality and with high performance.

[Sixth Exemplary Embodiment]

Description will be given of a sixth exemplary embodiment in which the present invention is favorably applied.

The image processing of the present invention may be implemented by executing software processing by use of a computer. That is, as FIG. 16 shows, an image processing section is constructed substantially as software processing by use of a computer.

FIGS. 17 and 18 show a flow of the image processing in accordance with the present exemplary embodiment in the image processing section 131. This image processing method is processing in which when eight-bit raster images including a secret image Sin, a reverse image Rin, and a public image Pin are inputted, a secret image display area is set based on Pin, image creation and data allocation are conducted, and a shutter control signal is generated. Steps S3 to S5 correspond to the processing in the detector circuit 122 shown in the first exemplary embodiment, steps S6 to S10 are associated with the processing in the output image creation circuit 123, step 11 corresponds to the processing in the data allocation circuit 121, and steps S12 to S14 are associated with the processing in the shutter glasses control signal generator circuit 103.

When the secret image Sin, the reverse image Rin, and the public image Pin (8 bits) are inputted, the image processing apparatus extracts information (i.e., X and Y coordinates of the pixel) indicating one of the pixels which is associated with the input image signal (step S2).

[Secret Image Display Area Setting Processing]

The image processing section 131 first sets a rectangular size (Xm×Ym) of the secret image (step S3). Next, the section 131 extracts the maximum gray scale Smax of the secret image Sin (step S4).

Subsequently, the section 131 extracts, from all X and Y satisfying Xs≤X≤Xs+Xm and Ys≤Y≤Ys+Ym, Xs and Ys holding a relation "Smax≤Pin gray scale value" (namely, the gray scale value of the public image is more than the maximum gray scale value of the secret image) as candidates for the start point of the secret image display area; by using one of the candidates, the section 131 sets the secret image display area (step S5). If Xs and Ys cannot be extracted, the section 131 multiplies all the values of Sin and Rin by k (k<1) to extract again Smax, and carries out the retrieval again until Xs and Ys satisfying the condition are extracted.

[Output Image Creation Processing]

In order that Sin is placed in the secret image display area (size: Xm×Ym) obtained in step S5, the image size of the secret image is converted (step S6). And the converted secret image is allocated to the area set in step S5 to create an output secret image Sout with the other area set as Sout=0 (black; step S7). Similarly, the image size of the reverse image is converted (step S8) and the converted reverse image is allocated to the area set in step S5 to create an output reverse image Rout with the other area set as Rout=0 (black; step S9). And an arithmetic operation of Pout=Pin−Sout−Rout is carried out to generate an output public image Pout (step S10).

[Data Allocation Processing]

One frame is divided into three subframes to select/to output an image according to the sequential number assigned to the current subframe to be outputted. Concretely, Sout, Rout, and Pout are selected for the first, second, and third subframes, respectively (step S11). The image allocated to the respective subframes are delivered as an output signal 112C to a display, not shown. Incidentally, since it is require that Sout cancels Rout, these subframes are required to be equal in the period to each other; however, the subframe period of Pout is not necessarily equal to those of Sout and Rout. That is, if Sout and Rout are equal in the subframe period to each other, Pout may have an arbitrary subframe period.

[Shutter Control Signal Creation Processing]

It is judged whether or not the selected image is a secret image (step S12); if the image is a secret image, a control signal to set the shutter to a transmission state is fed as a control signal 113C (step S13); otherwise, a control signal to set the shutter to a light interruption state is fed as a control signal 113C (step S14).

As above, by using software processing by a computer as the processing in step S1 to S14, it is possible to execute image processing similar to that of the image processing apparatus in accordance with the first exemplary embodiment e without using particular hardware.

Incidentally, the flowcharts shown in FIGS. 17 and 18 are used to execute image processing similar to that of the image processing apparatus in accordance with the first exemplary embodiment; however, image processing similar to that of the image processing apparatus in accordance with any one of the second to fourth exemplary embodiments may be conducted by software processing by use of a computer.

Meanwhile, each of the exemplary embodiments above is a favorable embodying example of the present invention, and the present invention is not restricted by the exemplary embodiments.

For example, in conjunction with each of the exemplary embodiments, description has not been particularly given of each of the R, G, and B signals; however, by executing processing similar to the processing of the above exemplary embodiments for the respective signal components, a similar advantage can be attained also for color images.

Additionally, the raster image is not necessarily a color image including image signals of a plurality of colors, but may be a monochrome image. That is, the configuration shown for each of the exemplary embodiments is not necessarily arranged for each color in parallel.

Further, description has been given by use of a configuration in which shutter glasses are adopted to perceive a secret image; however, the unit need not necessarily be in the contour of glasses if it can be installed between the display section and the user's eyes.

Moreover, the configuration in which a secret image is displayed once during the one-frame period is employed as an example; however, by increasing the number of subframes, the secret image may be displayed twice or more during the one-frame period. By setting the shutter glasses to a transmission state during the display period of the secret image, an advantage similar to those of the above embodying exemplary embodiments can be obtained.

As above, various variations are possible in accordance with the present invention.

BRIEF DESCRIPTION OF DRAWINGS

[FIG. 6] is a diagram showing a configuration of an image processing apparatus in accordance with a first exemplary embodiment in which the present invention is favorably applied.

[FIG. 13] is a diagram showing a configuration of an image processing apparatus in accordance with a fourth exemplary embodiment in which the present invention is favorably applied.

[FIG. 17] is a flowchart showing processing of an image processing method in accordance with the sixth exemplary embodiment.

[FIG. 18] is a flowchart showing processing of an image processing method in accordance with the sixth exemplary embodiment.

DESCRIPTION OF REFERENCE NUMERALS

Figure 1:
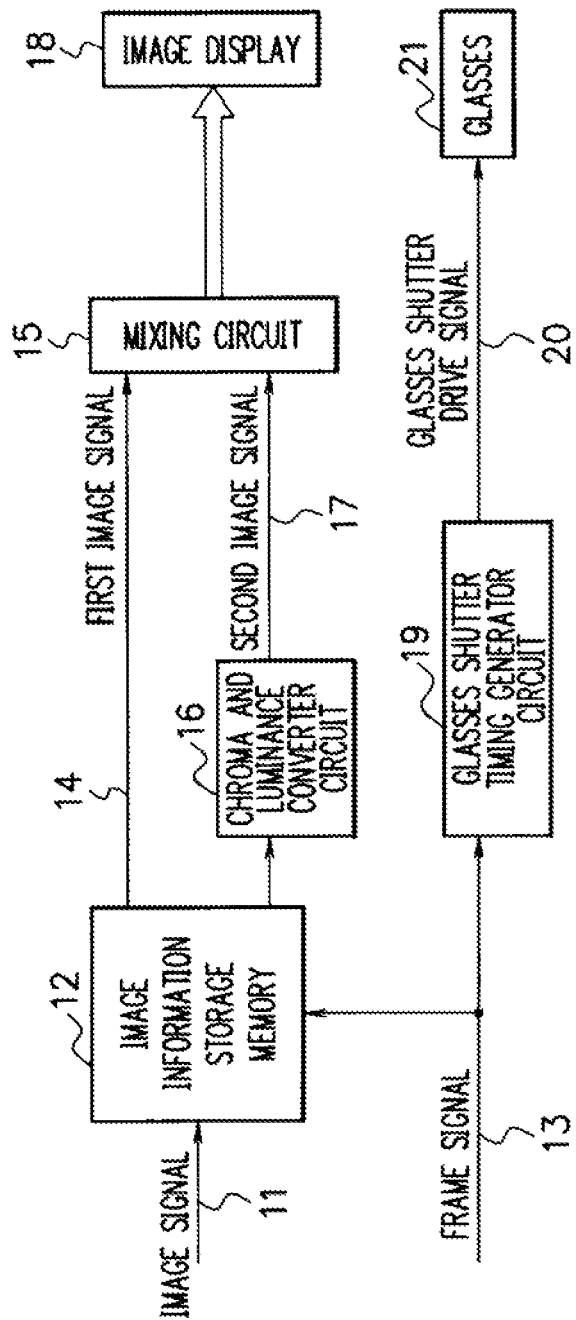
[FIG. 1] is a diagram showing structure of a conventional image processing apparatus.
Figure 2:
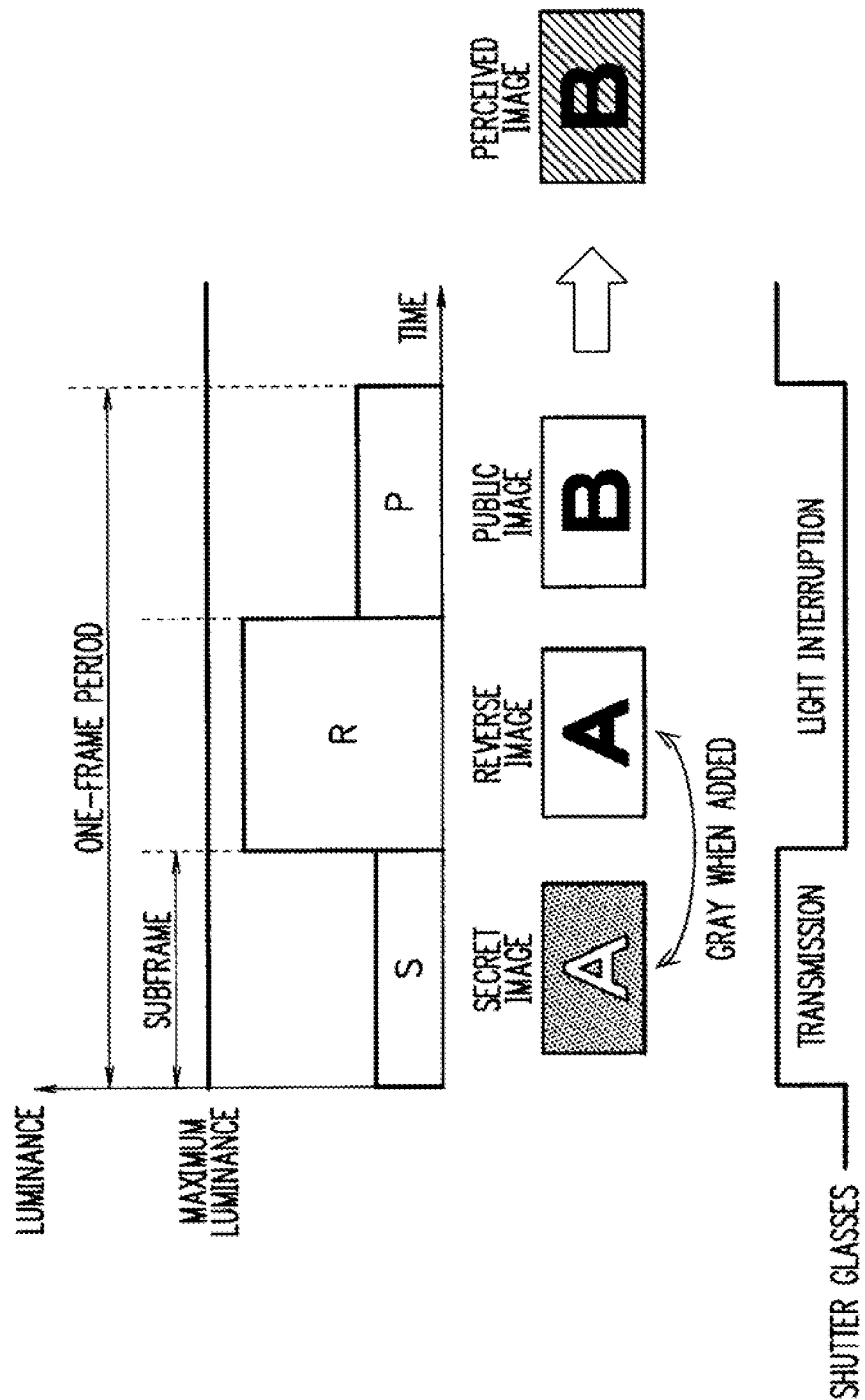
[FIG. 2] is a diagram showing an example of a sequential display operation of a secret image and a public image in a conventional scheme.
Figure 3:
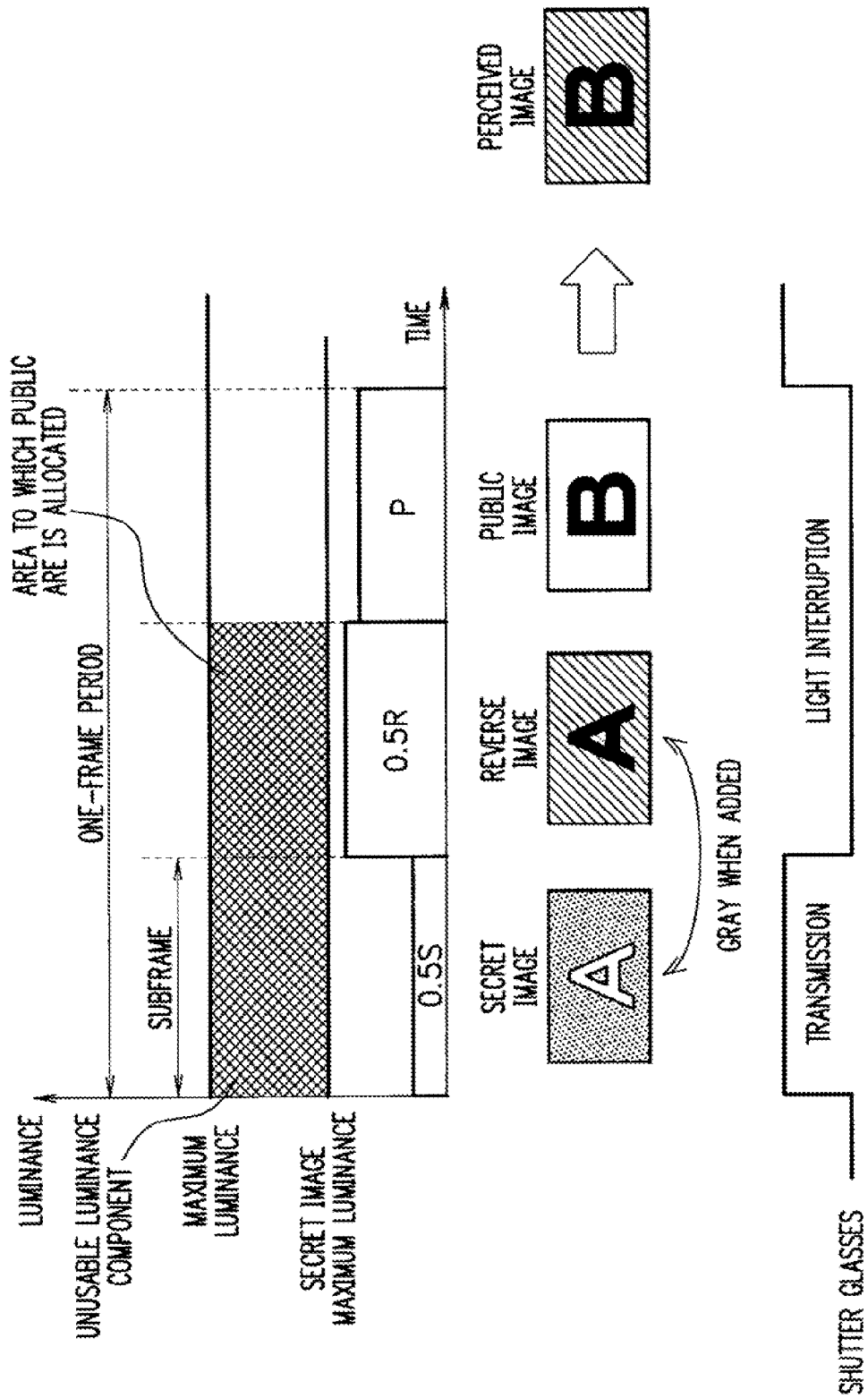
[FIG. 3] is a diagram showing another example of a sequential display operation of a secret image and a public image in a conventional scheme.
Figure 4:
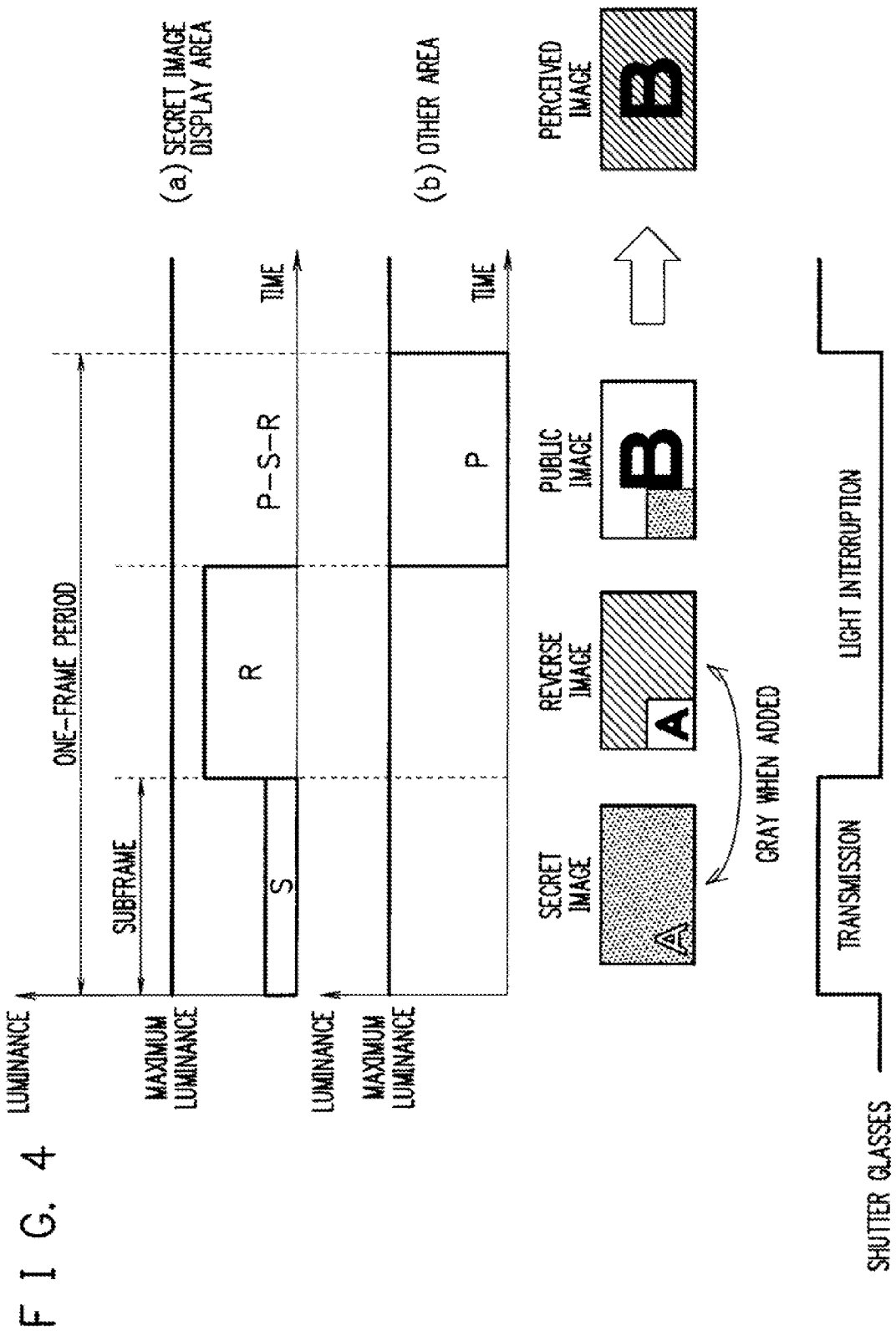
[FIG. 4] is a diagram showing an example of a sequential display operation of a secret image and a public image of the present invention.
Figure 5:
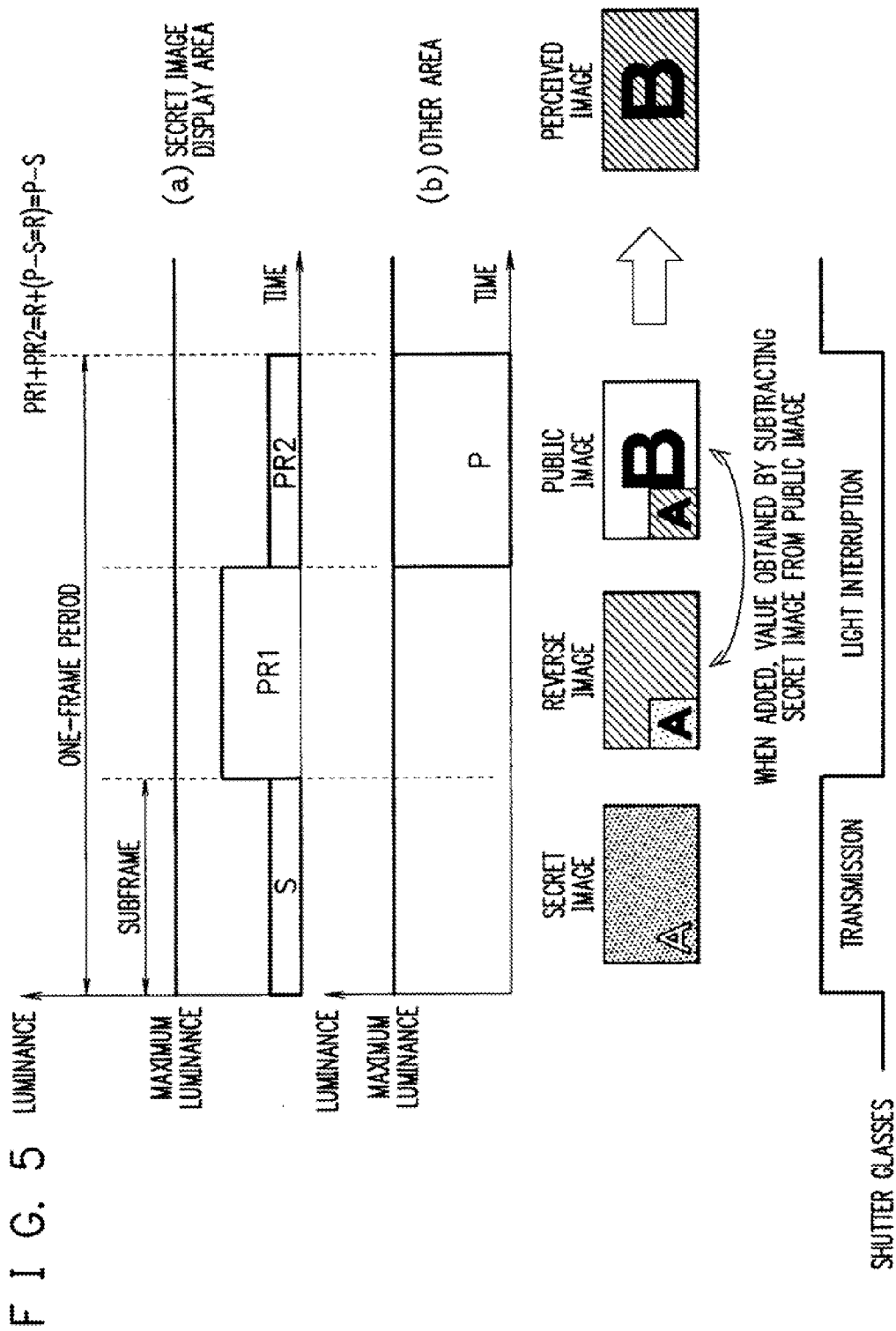
[FIG. 5] is a diagram showing another example of a sequential display operation of a secret image and a public image of the present invention.
Figure 7:
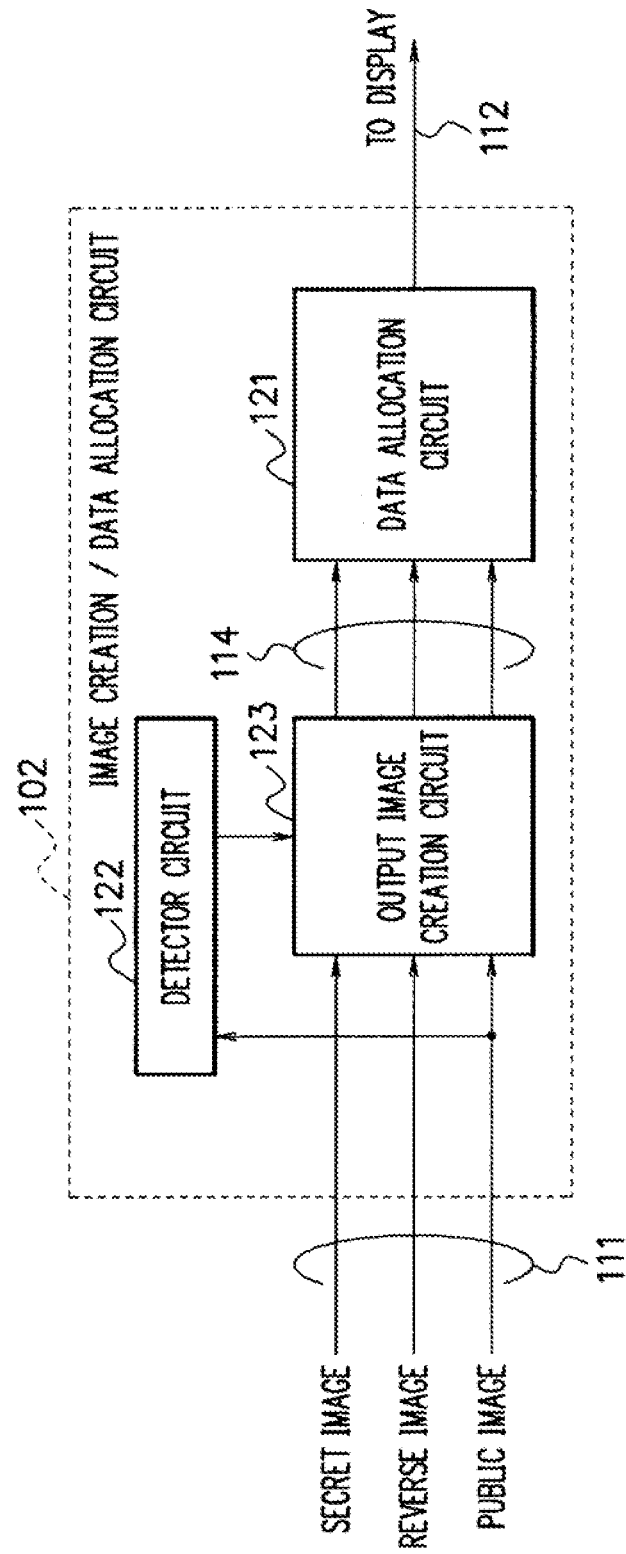
[FIG. 7] is a diagram showing structure of an image creation/data allocation circuit in accordance with the first exemplary embodiment.
Figure 8:
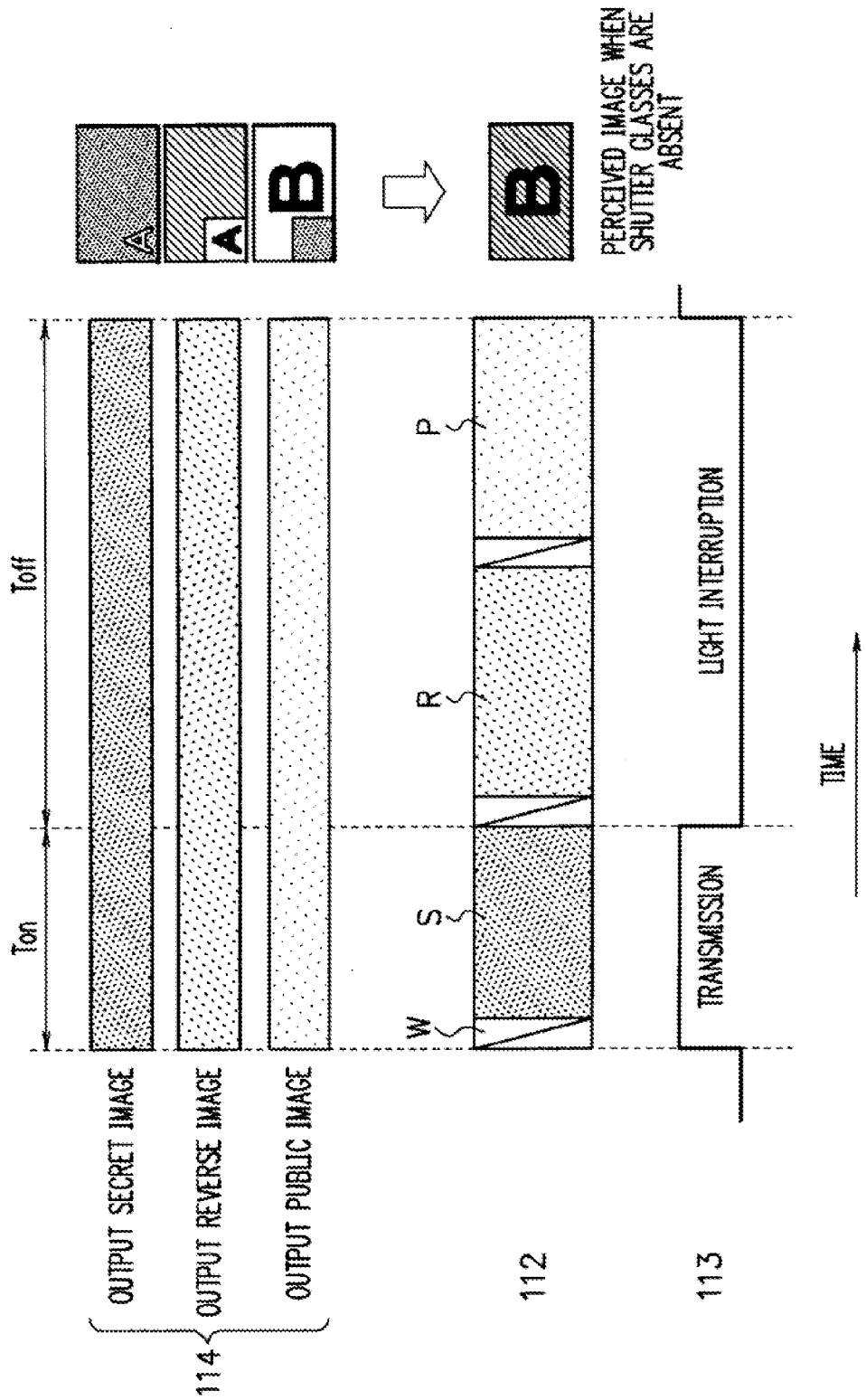
[FIG. 8] is a graph showing an example of a timing chart of respective control signals in the image processing apparatus in accordance with the first exemplary embodiment.
Figure 9:
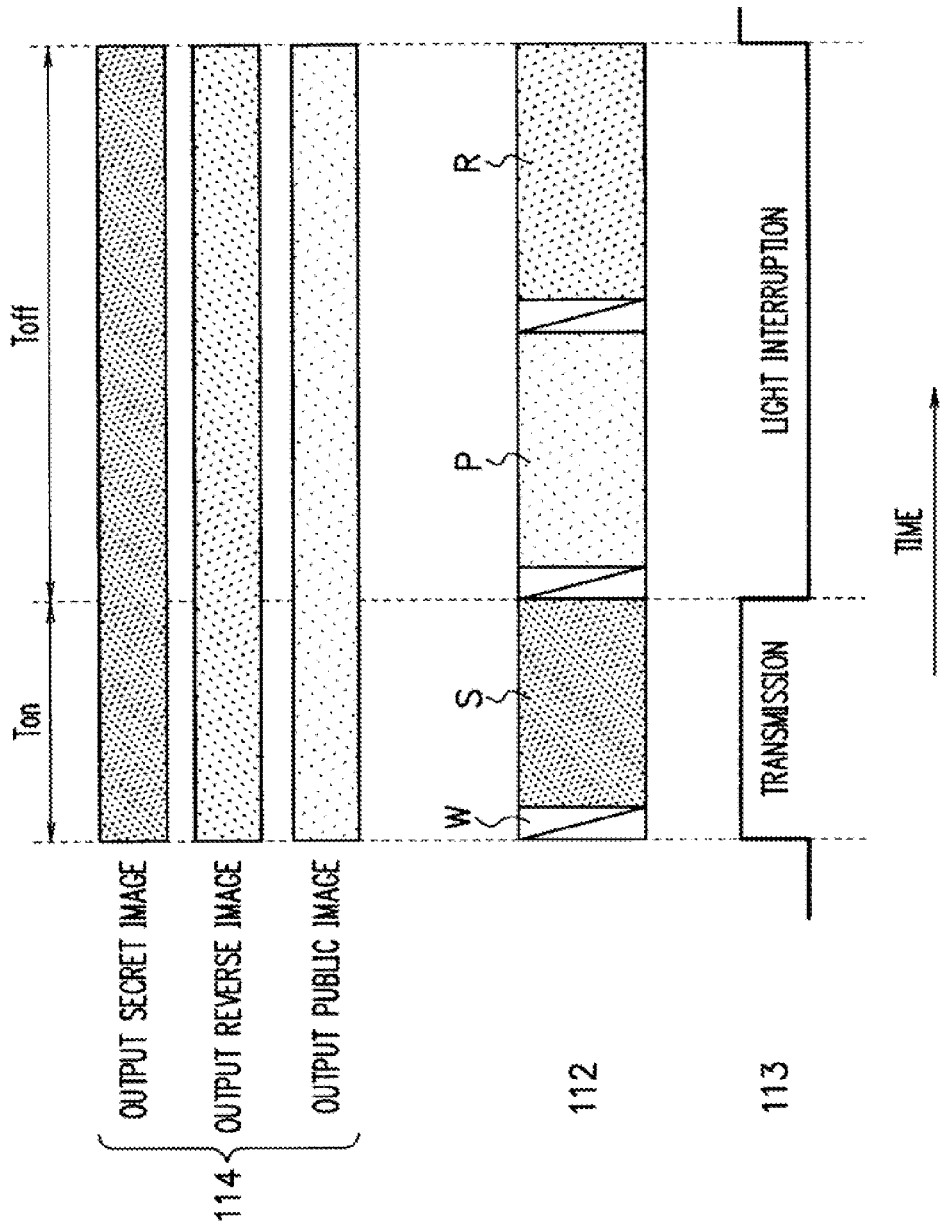
[FIG. 9] is a graph showing another example of a timing chart of respective control signals in the image processing apparatus in accordance with the first exemplary embodiment.
Figure 10:
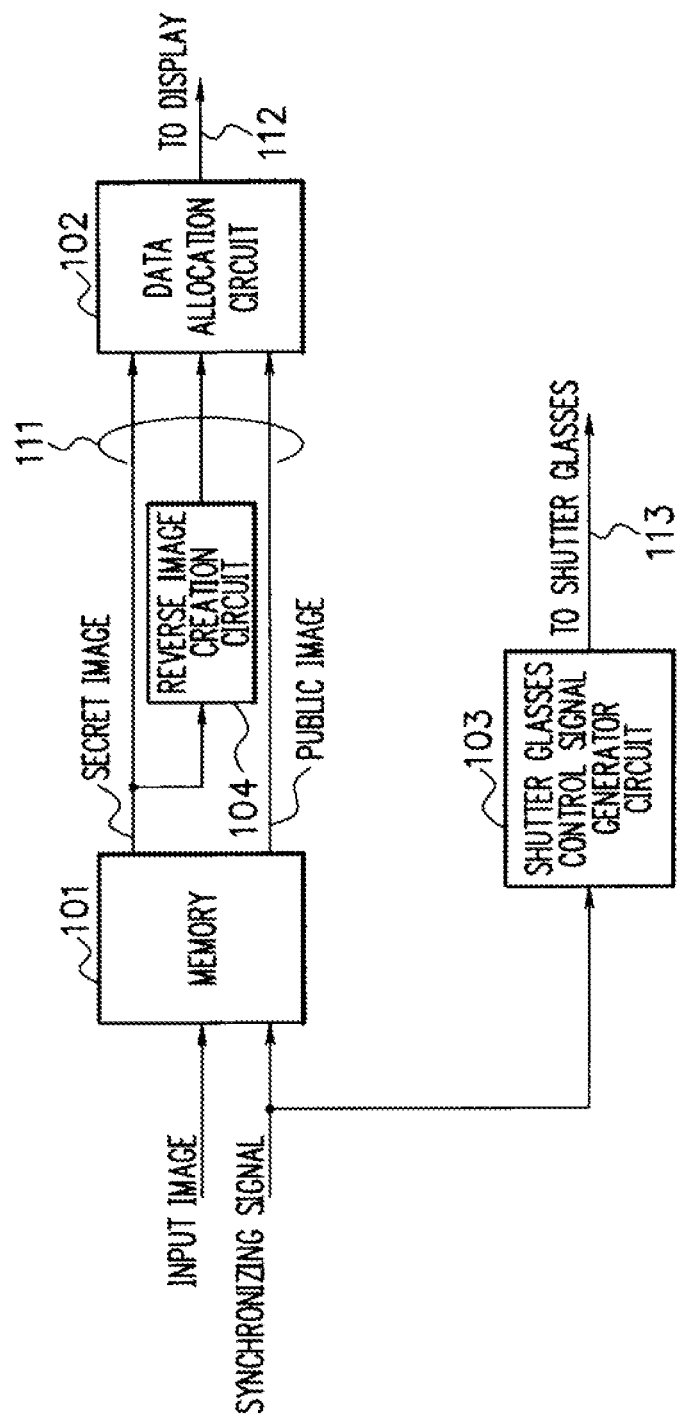
[FIG. 10] is a diagram showing a configuration of an image processing apparatus in accordance with a second exemplary embodiment in which the present invention is favorably applied.
Figure 11:
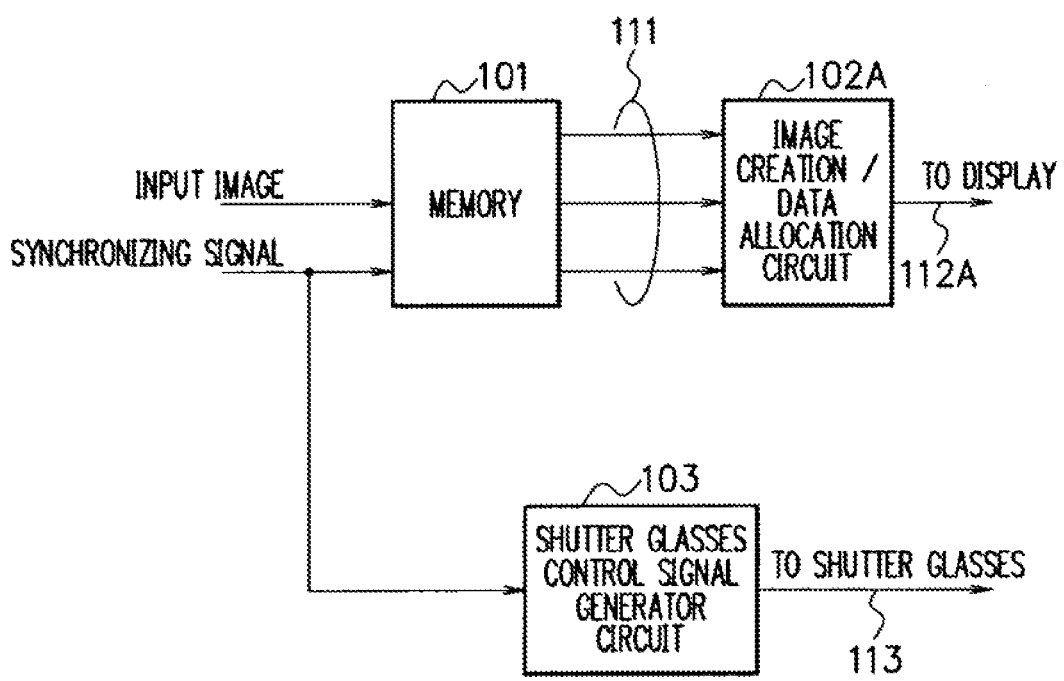
[FIG. 11] is a diagram showing a configuration of an image processing apparatus in accordance with a third exemplary embodiment in which the present invention is favorably applied.
Figure 12:
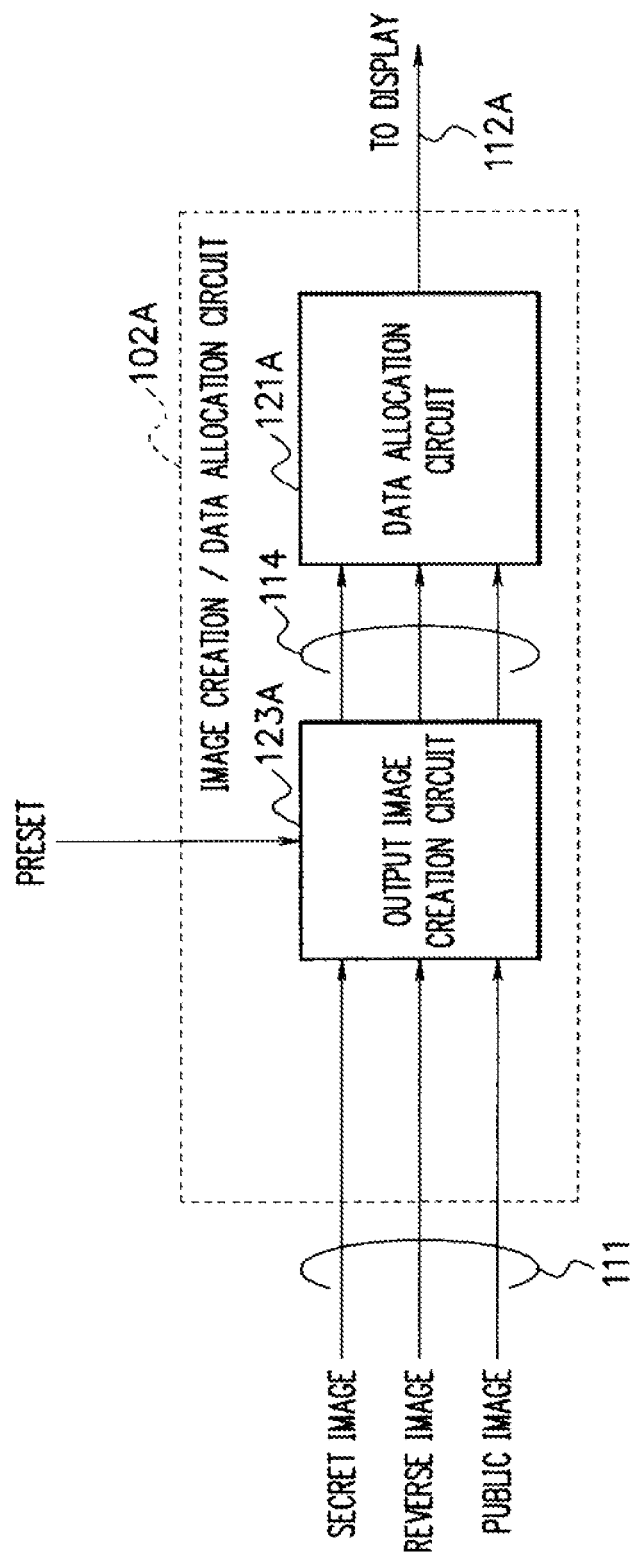
[FIG. 12] is a diagram showing structure of an image creation/data allocation circuit in accordance with the third exemplary embodiment.
Figure 14:
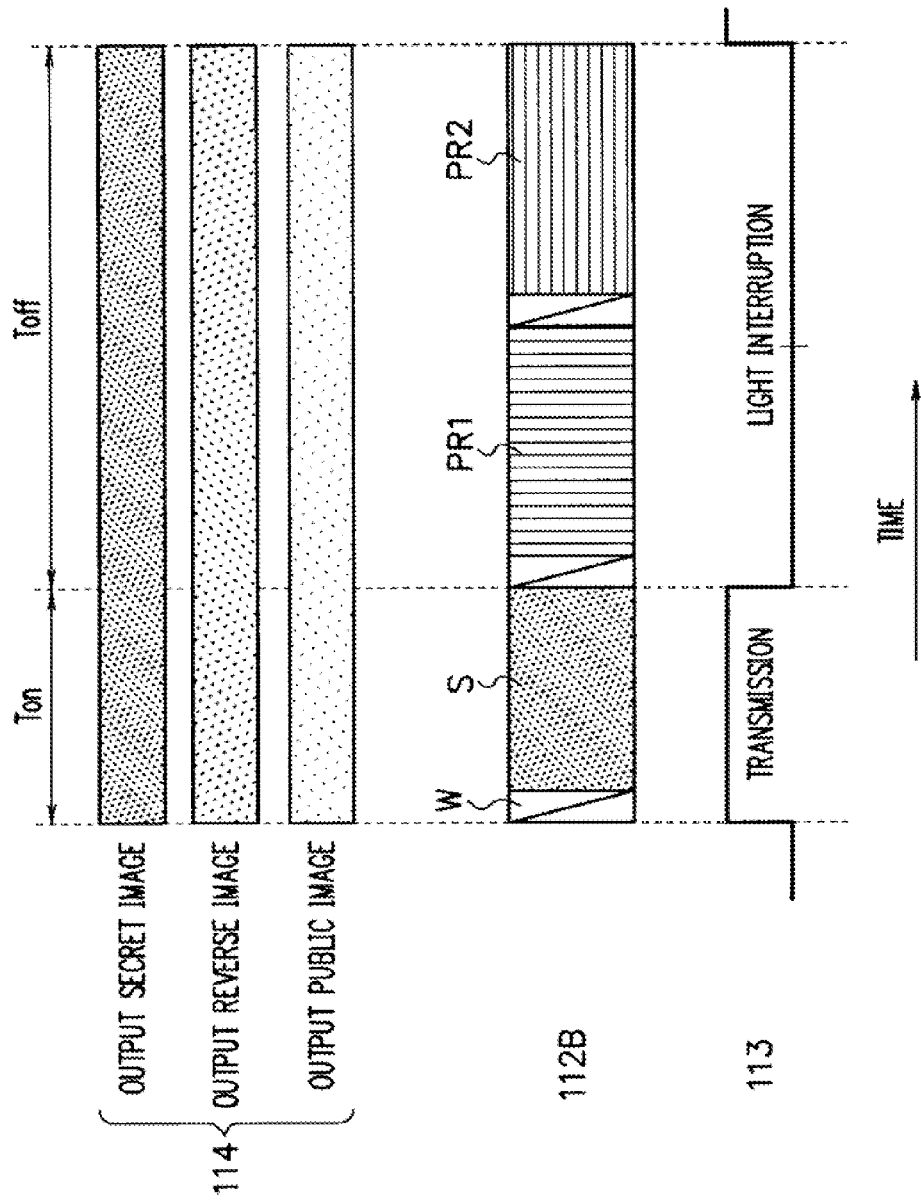
[FIG. 14] is a graph showing another example of a timing chart of respective control signals in the image processing apparatus in accordance with the fourth exemplary embodiment.
Figure 15:
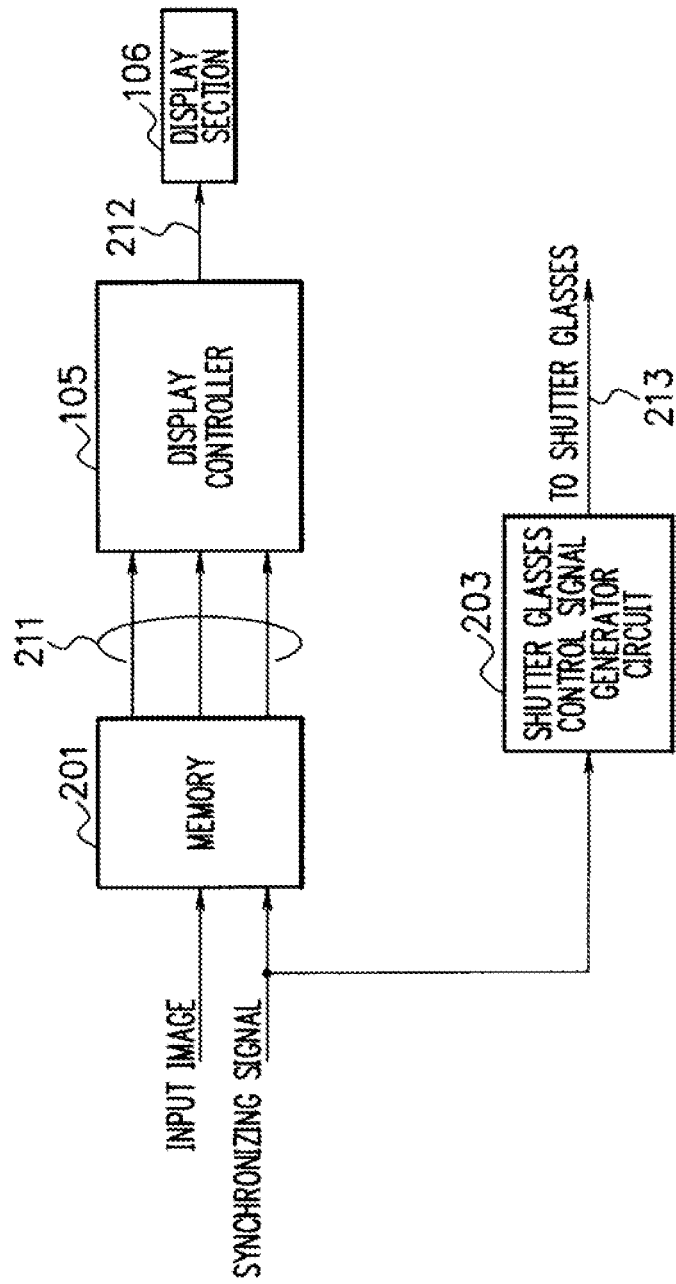
[FIG. 15] is a diagram showing a configuration of an image processing apparatus in accordance with a fifth exemplary embodiment in which the present invention is favorably applied.
Figure 16:
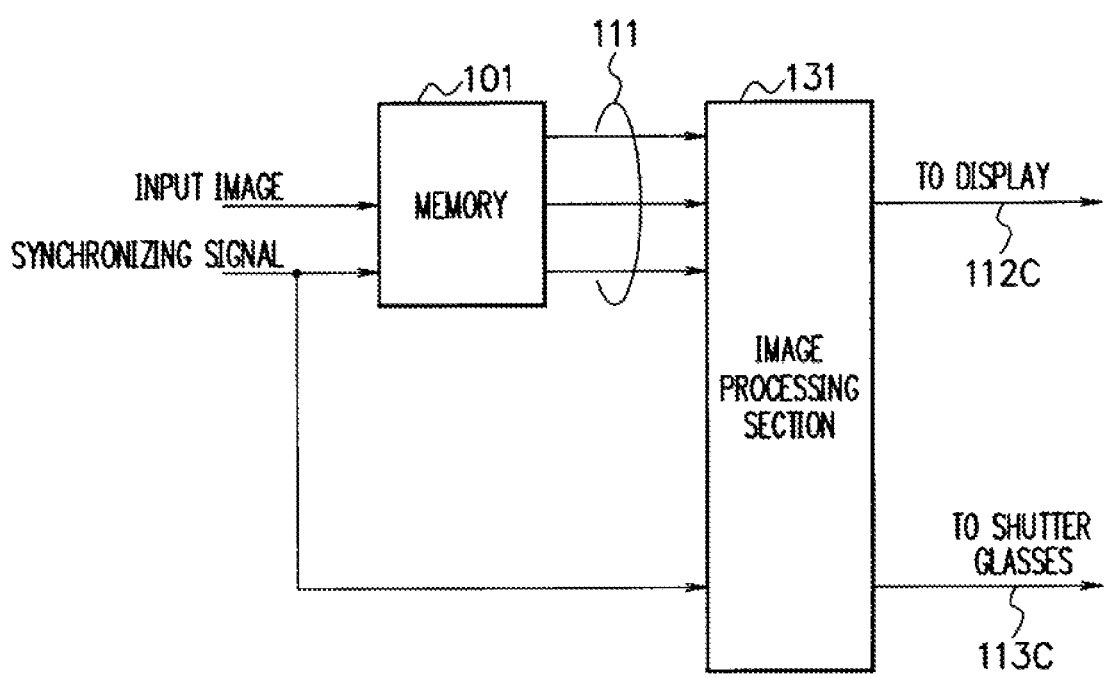
[FIG. 16] is a diagram showing a configuration of an image processing apparatus in accordance with a sixth exemplary embodiment in which the present invention is favorably applied.

101, 201 Memory
102, 102A, 102B Image creation/data allocation circuit
103, 203 Shutter glasses control signal generator circuit
105 Display controller
106 Display section
111 Output signal (memory)
112 Output signal (image creation/data allocation circuit)
113 Output signal (shutter glasses control signal generator circuit)
114 Output signal (output image creation circuit)
121 Data allocation circuit
122 Detector circuit
123, 123A Output image creation circuit

The invention claimed is:

1. An image processing apparatus for creating of three image signals using three input images, including a secret image which only particular users can browse, a reverse image which an addition thereof to the secret image for each pixel is an image not having any correlation with the secret image, and a public image which unspecified persons can browse, and sequentially outputting the image signals therefrom: wherein
- an area in which a luminance value in the public image is equal to or more than a predetermined value is detected;
- a region, in which the secret image is displayed, is set in the area, the area is smaller in size than the public image, and the area is equal in size to the secret and reverse images;
- a first image signal, as one of the image signals, which displays the secret image in said region, is created;
- a second image signal, as one of the image signals, which displays the reverse image in said region, is created;
- a third image signal, as one of the image signals, which displays the image obtained by subtracting the added result of luminance of the secret and reverse images from the luminance of the public image, is created;
- the first, second, and third image signals are sequentially output; and the apparatus comprises an optical shutter control unit which controls, during a period in which at least the first image signal is being outputted, a shutter disposed between a display to which the image signals are inputted and user's eyes to set the shutter to a light transmission state.

2. An image processing apparatus in accordance with claim 1, wherein the luminance of the secret and reverse images is multiplied for each pixel by a modulation degree of less than one.

3. An image processing apparatus in accordance with claim 1, wherein the luminance of the public image is multiplied for each pixel by a fixed number more than one.

4. An image processing apparatus for creating of three image signals using of three input images, including a secret image which only particular users can browse, a reverse image which an addition thereof to the secret image for each pixel is an image not having any correlation with the secret image, and a public image which unspecified persons can browse, and sequentially outputting the image signals therefrom comprising:
- a detecting unit which detects an area in which a luminance value in the public image is equal to or more than a predetermined value, and sets a region, in which the secret image is displayed, in said area, the area is smaller in size than the public image, the area is equal in size to the secret and reverse images;
- a first image creation unit which creates, as one of the image signals, a first image signal which displays the secret image in said region;
- a second image creation unit which creates, as one of the image signals, a second image signal which display the reverse image in said region;
- a third image creation unit which creates a second third signal, as one of the image signals, image which displays the image obtained by subtracting the added result of luminance of the secret and reverse images from the luminance of the public image,
- wherein the first, second, and third image signals are sequentially output; and an optical shutter control unit which controls, during a period in which at least the first image signal is being outputted, a shutter disposed between a display to which the image signals are inputted and user's eyes to set the shutter to a light transmission state.

5. An image processing method of creating three image signals using three input images, including a secret image which only particular users can browse, a reverse image which an addition thereof to the secret image for each pixel is an image not having any correlation with the secret image, and a public image which unspecified persons can browse, and sequentially producing the image signals: wherein
- an area in which a luminance value in the public image is equal to or more than a predetermined value is detected;
- a region, in which the secret image is displayed, is set in the area, the area smaller in size than the public image, and the area equal in size to the secret and reverse images;
- a first image signal, as one of the image signals, which displays the secret image in said region, is created;
- a second image signal, as one of the image signals, which displays the reverse image in said region, is created;
- a third image signal, as one of the image signals, which displays the image obtained by subtracting the added result of luminance of the secret and reverse images from the luminance of the public image, is created;
- the first, second, and third image signals are sequentially output; and
- the method comprises an optical shutter control step of controlling, during a period in which at least the first image signal is being outputted, a shutter disposed between a display to which the image signals are inputted and user's eyes to set the shutter to a light transmission state.

6. A non-transitory computer readable storage medium for storing an image processing program making a computer execute an image processing method in accordance with claim 5.

7. A display for sequentially displaying, by a display unit, images corresponding to three image signals created using three input images, including a secret image which only particular users can browse, a reverse image which an addition thereof to the secret image for each pixel is an image not having any correlation with the secret image, and a public image which unspecified persons can browse; wherein
- an area in which a luminance value the public image is equal to or more than a predetermined value is detected;
- a region, in which the secret image is displayed, is set in the area, the area smaller in size than the public image, and the area equal in size to the secret and reverse images;
- a first image signal, as one of the image signals, which displays the secret image in said region, is created;
- a second image signal, as one of the image signals, which displays the reverse image in said region, is created;
- a third image signal, as one of the image signals, which displays the image obtained by subtracting the added result of luminance of the secret and reverse images from the luminance of the public image, is created;
- the first, second, and third image signals are sequentially output; and
- the display comprises an optical shutter control unit which controls, during a period in which at least the first image signal is being outputted, a shutter disposed between the display unit and user's eyes to set the shutter to a light transmission state.

* * * * *